United States Patent
Taniguchi et al.

[11] Patent Number: 5,964,335
[45] Date of Patent: Oct. 12, 1999

[54] PARKING DEVICE FOR AUTOMATIC TRANSMISSION

[75] Inventors: Takao Taniguchi, Okazaki; Kazumasa Tsukamoto, Toyota; Fumitomo Yokoyama, Nishikamo-gun; Kazuhisa Ozaki, Nukata-gun; Akihiro Kuroyanagi, Okazaki; Akihito Hongoya, Anjo; Yasuo Hojo, Nagoya; Shoichi Sayo; Kagenori Fukumura, both of Toyota; Yasunori Nakawaki, Nishikamo-gun; Atsushi Tabata, Okazaki; Yasunari Nakamura, Nagoya; Nobuaki Takahashi; Hideki Miyata, both of Toyota, all of Japan

[73] Assignees: Aisin AW Co., Ltd., Anjo; Toyota Jidosha Kabushiki Kaisha, Toyota, both of Japan

[21] Appl. No.: 09/101,195
[22] PCT Filed: Jan. 10, 1997
[86] PCT No.: PCT/JP97/00041
    § 371 Date: Sep. 11, 1998
    § 102(e) Date: Sep. 11, 1998
[87] PCT Pub. No.: WO97/25231
    PCT Pub. Date: Jul. 17, 1997

[30] Foreign Application Priority Data

Jan. 12, 1996 [JP] Japan .................................. 8-0004249
Jul. 16, 1996 [JP] Japan .................................. 8-186381

[51] Int. Cl.⁶ ............................ B60T 1/06; B60K 41/26
[52] U.S. Cl. .................... 192/219.5; 74/411.5; 74/577 S; 188/31
[58] Field of Search ............................. 192/219.4, 219.5; 74/411.5, 577 R, 577 S; 188/31, 69

[56] References Cited

U.S. PATENT DOCUMENTS

| | | | |
|---|---|---|---|
| 3,990,541 | 11/1976 | Dobrinka et al. | 188/31 |
| 4,200,002 | 4/1980 | Takahashi | 192/219.5 |
| 4,576,261 | 3/1986 | Barr | 192/219.5 |
| 5,365,804 | 11/1994 | Downs et al. | 188/31 |
| 5,526,909 | 6/1996 | Ohkawa et al. | 192/219.5 |

Primary Examiner—Richard M. Lorence
Attorney, Agent, or Firm—Oliff & Berridge, PLC

[57] ABSTRACT

A parking control mechanism to prevent generation of noise and shock when a parking range is released after a vehicle has been parked so that a driver does not feel uncomfortable. A parking apparatus of an automatic transmission has a parking gear; a parking pole swingably disposed and provided with a claw arranged to selectively be engaged with a tooth space of the parking gear; an engagement inhibition device movably disposed and arranged to be moved to an inhibition position for inhibiting engagement between the claw and the tooth space and to an inhibition release position for releasing the inhibition of the engagement; and an engagement inhibition release device for moving the engagement inhibition device to the inhibition release position in synchronization with the rotation of the parking gear. After a residual torque existing between the parking gear and drive wheels has been released, the claw and the tooth space are engaged with each other.

23 Claims, 24 Drawing Sheets

PARKING DEVICE FOR AUTOMATIC TRANSMISSION

BACKGROUND OF THE INVENTION

1. Field of Invention

The invention relates to a parking apparatus of an automatic transmission.

2. Description of Related Art

Hitherto, a vehicle having an automatic transmission mounted thereon has a structure in which a torque generated by operating an engine is transmitted to the transmission through a torque converter. Then, the torque is converted by the transmission, and then the converted torque is transmitted to drive wheels. In this case, unlike the vehicle provided with a manual transmission, the vehicle cannot be kept stopped by the gear position (the gear ratio) selected to stop the vehicle and inertia of the engine.

Therefore, a method has been employed in which a parking pole is rotated in synchronization with the operation of a shift lever when the parking range has been selected by operating the shift lever. Thus, a claw provided for the parking pole and a tooth space of the parking gear connected to an output shaft of the automatic transmission are engaged to each other so that the output shaft is locked (refer to Japanese Patent Laid-Open No. 61-41622).

FIG. 1 is a front view showing a conventional parking apparatus of an automatic transmission. FIG. 2 is a side view showing the conventional parking apparatus of the automatic transmission.

Referring to FIGS. 1 and 2, the parking apparatus of the automatic transmission incorporates a rod 83 arranged to be moved forwards/reversely (from side to side in FIG. 2) by a detent lever (not shown); a cam 84 slidably disposed along the rod 83 at a predetermined position thereof so as to convert linear motion into rotational motion; a parking pole 87 having a claw 94 in the substantially central portion thereof and arranged to be swung when the cam 84 is moved forwards or reversely; and a parking gear 66. The leading end of the parking pole 87 is supported by the cam 84.

The parking gear 66 is connected to an output shaft (not shown) so that the parking gear 66 is rotated in a direction indicated by an arrow A when the vehicle is moved forwards. When the vehicle is moved in reverse, the parking gear 66 is rotated in a direction indicated by an arrow B. The parking pole 87 is supported swingably about the pole shaft 93. When the parking pole 87 is rotated in a direction indicated by an arrow C, the parking pole 87 causes the claw 94 and a tooth space 62 of the parking gear to be engaged to each other. When the parking pole 87 is rotated in a direction indicated by an arrow D, the claw 94 and the tooth space 62 are disengaged. The pole shaft 93 is provided with a torsion spring (not shown) so that the parking pole 87 is urged in the direction indicated by the arrow D.

The detent lever is connected to a manual shaft (not shown) arranged to be rotated in synchronization with the operation of a shift lever (not shown) disposed in a driver's seat. The detent lever formed as a plate-like member arranged to be rotated about the manual shaft has a plurality of engagement grooves corresponding to the shifting positions of the shift lever formed in the peripheral portion thereof. The leading end of a detent spring (not shown) can be engaged to any one of the engagement grooves. Therefore, when the shift lever is operated and thus the detent lever is rotated, the rod 83 is moved forwards or reversely to follow the rotation of the detent lever.

A compression spring 85 is provided for the rod 83 at a position to rearward (at a right-hand position in FIG. 2) of the cam 84. The cam 84 has a conical surface formed into two steps and having a vertex facing the front end of the rod 83.

When the rod 83 has been moved forwards (to the left in FIG. 2), the cam 84 is introduced into a position between a bracket 95 and the parking pole 87 so the parking pole 87 is moved upwards and rotated in the direction indicated by the arrow C. When the rod 83 has been moved reversely (to the right in FIG. 2), the cam 84 is separated from the position between the bracket 95 and the parking pole 87. Thus, the parking pole 87 is rotated in the direction indicated by the arrow D through the urging force of the torsion spring at the pole shaft 93.

When a vehicle which is being moved in a forward drive range or a reverse drive range is to be stopped and parked, the above-mentioned conventional parking apparatus of the automatic transmission requires a driver to depress a brake pedal (not shown) to stop the vehicle. Then, the driver operates the shift lever to select a parking range so that the output shaft is locked.

In the above-mentioned case, the accelerator pedal (not shown) has been released when the driver depresses the brake pedal to stop drive wheels (not shown). Therefore, an engine (not shown) is in an idling state. Since the engine and the drive wheels are connected to each other through a torque converter, a transmission and the like (not shown) in the above-mentioned idling state, the torque generated by the engine causes the drive wheels to be rotated. Therefore, the output shaft and the parking gear 66 are caused to be rotated in the direction indicated by the arrow A or B.

When the driver selects the parking range by operating the shift lever simultaneously with depression of the brake pedal to stop the vehicle, the claw 94 and the tooth space 62 are engaged with each other in a state in which the parking gear 66 would normally be rotated in the direction indicated by the arrow A or B, that is, in a state in which the drive force (the torque) is maintained.

In the foregoing case, the output shaft is undesirably locked in a state in which residual torque is retained between the parking gear 66 and the drive wheels. That is, a shaft provided for a power transmission system arranged from the output shaft to the drive wheels is brought to a state in which the shaft is twisted.

If the driver operates the shift lever to select another range in order to drive the vehicle, the residual torque between the parking gear 66 and the drive wheels is discharged rapidly. As a result, noise and shock are generated, thus making the driver feel uncomfortable.

SUMMARY OF THE INVENTION

An object of the invention is to provide a parking apparatus of an automatic transmission which is capable of overcoming the above-mentioned problem experienced with the conventional parking apparatus of an automatic transmission and with which generation of noise and shock can be prevented when the parking range has been released and thus a driver does not feel uncomfortable.

Accordingly, a parking apparatus of an automatic transmission includes a parking gear, a parking pole swingably disposed and provided with a claw arranged to selectively be engaged with a tooth space of the parking gear, engagement inhibition means movably disposed and arranged to be moved to an inhibition position for inhibiting engagement between the claw and the tooth space and to an inhibition release position for releasing the inhibition of the engagement, and engagement inhibition release means for moving the engagement inhibition means to the inhibition release position in synchronization with the rotation of the parking gear.

In the foregoing case, when the vehicle is stopped and a shifting apparatus is operated to select a parking range so as to engage the claw with the tooth space, the engagement inhibition means inhibits the engagement between the claw and the tooth space.

Since the engagement inhibition release means brings the engagement inhibition means to an inhibition release position in synchronization with the rotation of the parking gear, the claw and the tooth space are brought into engagement after the residual torque existing between the parking gear and the drive wheels has been released.

Therefore, undesirable locking of the output shaft in a state in which the residual torque existing between the parking gear and the drive wheels can be prevented.

Since generation of noise and shock can be prevented when a driver intends to move the vehicle again and the engagement between the claw and the tooth space is released, the driver does not feel uncomfortable.

According to another aspect of the invention, there is provided a parking apparatus of an automatic transmission having a structure in which the engagement inhibition means is provided with restoring means and arranged to be restored to the inhibition position by the restoring means when the clamor and the tooth space has been disengaged.

In the foregoing case, when the driver has operated the shifting apparatus to select, for example, the forward drive range or the reverse drive range, the parking pole swings so that the engagement between the claw and the tooth space is released. Thus, the engagement inhibition means is restored to the inhibition position by the restoring means.

Therefore, when the vehicle is stopped again and the shifting apparatus is operated to select the parking range, the engagement between the claw and the tooth space can be inhibited assuredly.

According to another aspect of the invention, there is provided a parking apparatus of an automatic transmission having a structure in which the engagement inhibition means is provided radially outwardly of a claw with respect to a swing shaft of the parking pole.

In the foregoing case, a stress acts between the swing shaft of the parking pole and the claw when the parking pole is located at the engagement position. Since no recess is formed in the foregoing portion, stress concentration can be prevented.

Therefore, the durability of the parking pole can be improved.

According to another aspect of the invention, there is provided a parking apparatus of an automatic transmission having a structure in which the parking gear has a continuous contact surface formed adjacent to teeth and tooth spaces and arranged to be brought into contact with the engagement inhibition means.

Since the engagement inhibition means is not brought into contact with the tooth in the foregoing case, the durability of the parking gear can be improved.

According to another aspect of the invention, there is provided a parking apparatus of an automatic transmission having a structure in which a recess is formed in a surface of the parking pole which is opposite to the parking gear so that a portion of the engagement inhibition means is accommodated in the recess.

In this case, a portion of the engagement inhibition means can be accommodated in the recess. Therefore, the size of the parking apparatus of an automatic transmission in an axial direction can be reduced.

According to another aspect of the invention, there is provided a parking apparatus of an automatic transmission having a structure in which the engagement inhibition means is disposed adjacent to the parking pole.

In this case, since the engagement inhibition means is disposed adjacent to the parking pole, the size can be determined without being influenced by the shape of the parking pole.

Therefore, if the torque generated by the engine mounted on the vehicle is at a high level and a great residual torque is retained between the parking gear and the drive wheels when the vehicle has been stopped, the engagement inhibition means can be enlarged to cope with such a high residual torque.

According to another aspect of the invention, there is provided a parking apparatus of an automatic transmission having a structure in which the engagement inhibition means has a pin provided radially inwardly of the claw with respect to a swing shaft of the parking pole, a swinging member disposed swingably about the pin and having, at the leading end thereof, a contact surface arranged to selectively be brought into contact with the front surface of the tooth, and a coil spring. The engagement inhibition means is restored to the inibition position by the coil spring upon disengagement between the claw and the tooth space.

In this case, when the vehicle has been stopped and the shifting apparatus has been operated to select the parking range, the parking gear is stopped and the parking pole is brought into the engagement position. However, the contact surface of the swinging member and the front surface of the tooth are brought into contact with each other, thus inhibiting engagement between the claw and the tooth space.

Therefore, undesirable locking of the output shaft in a state in which a residual torque exists between the parking gear and the drive wheels can be prevented.

When a driver attempts to run the vehicle again by operating the shifting apparatus to release the parking range, the generation of noise and shock can be prevented. Therefore, the driver does not feel uncomfortable.

According to another aspect of the invention, there is provided a parking apparatus of an automatic transmission having a structure in which the engagement inhibition means has a pin provided radially inwardly of the claw with respect to a swing shaft of the parking pole, a swinging member disposed swingably about the pin and having, at the leading end thereof, a contact surface arranged to selectively be brought into contact with the front surface of the tooth, and a coil spring. The engagement inhibition means is restored to the inhibition position by the coil spring upon disengagement between the claw and the tooth space.

In this case, a portion between the swing shaft of the parking pole and the claw is stressed when the parking pole is at the engagement position. Since no pin is disposed in the foregoing portion, stress concentration can be prevented.

Therefore, the durability of the parking pole can be improved.

According to another aspect of the invention, there is provided a parking apparatus of an automatic transmission having a structure in which the engagement inhibition means has a pin provided radially outwardly of the claw with respect to a swing shaft of the parking pole, a swinging member disposed swingably about the pin and having, at the leading end thereof, a contact surface arranged to selectively be brought into contact with a continuous contact surface adjacent to the tooth and the tooth space, and a coil spring. The engagement inhibition means is restored to the inhibition position by the coil spring upon disengagement between the claw and the tooth space.

According to another aspect of the invention, there is provided a parking apparatus of an automatic transmission having a structure in which the restoring means has first and second coil springs and a guide member disposed therebetween.

Since the guide member is disposed between the first and second coil springs, winding between the first and second coil springs caused in conjunction with a swing motion of the swinging member can be prevented.

According to another aspect of the invention, there is provided a parking apparatus of an automatic transmission having a structure in which the first and second coil springs are integrally formed and connected in series with each other.

In this case, since the guide member does not have to be disposed between the first and second coil springs, the cost can be reduced.

According to another aspect of the invention, there is provided a parking apparatus of an automatic transmission having a structure in which the engagement inhibition means has a swinging member provided swingably about the parking pole. The parking pole has a stopper for restraining rotation of the swinging member.

In this case, when the swinging member is hit by the rotating parking gear, the rotation of the swinging member can be restrained by the stopper. Therefore, the durability of the engagement inhibition means can be improved.

According to another aspect of the invention, there is provided a parking apparatus of an automatic transmission having a structure in which the swinging member has a restraining pin which can be brought into contact with the stopper, and the restraining pin is formed separately from the swinging member.

Since the swinging member can be formed by pressing or the like in this case, the cost can be reduced.

According to another aspect of the invention, there is provided a parking apparatus of an automatic transmission including a parking gear, a parking pole disposed swingably and having a claw arranged to selectively be engaged with a tooth space of the parking gear, engagement inhibition means movably disposed and arranged to be moved to an inhibition position for inhibiting engagement between the claw and the tooth space and an inhibition release position for releasing the engagement; a friction engagement element arranged to be engaged when a predetermined drive range has been selected and released when a parking range has been selected; and engagement inhibition release means for bringing the engagement inhibition means to the inhibition release position in accordance with a state of the friction engagement element.

In this case, the engagement inhibition release means brings the engagement inhibition means to the inhibition release position in accordance with the state of the friction engagement element. Therefore, the residual torque existing between the parking gear and the drive wheels is released in synchronization with the rotation of the parking gear. Then, the claw is engaged with the tooth space.

Therefore, undesirable locking of the output shaft in the state in which the residual torque exists between the parking gear and the drive wheels can be prevented.

When the driver has attempted to run the vehicle and thus the engagement between the claw and the tooth space has been released, generation of noise and shock can be prevented. Therefore, the driver does not feel uncomfortable.

According to another aspect of the invention, there is provided a parking apparatus of an automatic transmission having a structure in which each of the friction engagement element and the engagement inhibition release means has a hydraulic servo, and the same hydraulic pressure is applied to each hydraulic servo.

In this case, the engagement inhibition means can be moved by the hydraulic servo, release of the friction engagement element can be detected without using a special sensor or the like. Therefore, the cost can be reduced.

According to another aspect of the invention, there is provided a parking apparatus of an automatic transmission having a structure further including a rod arranged to be moved forwards or reversely when a shifting apparatus has been operated; and a cam disposed slidably with respect to the rod and arranged to swing the parking pole when the rod is moved forward or in reverse.

The engagement inhibition means is moved in a direction in which the rod is moved, i.e., forward or reverse.

In this case, since the engagement inhibition means is moved in the direction in which the rod is moved forward or in reverse, a load applied by the rod is prevented from acting as bending stress. The durability of the engagement inhibition means, thus, can be improved.

According to another aspect of the invention, there is provided a parking apparatus of an automatic transmission having a structure in which an engagement member is secured to the cam, and the engagement inhibition means is detachably disposed with respect to the engagement member.

In this case, when the rod is moved forwards, the cam slides with respect to the rod. Thus, the engagement between the claw and the tooth space is inhibited.

Therefore, even if the engagement between the claw and the tooth space is inhibited, the shifting apparatus can be moved from the reverse drive range position to the parking range position. Therefore, shifting feeling can be improved.

According to another aspect of the invention, there is provided a parking apparatus of an automatic transmission having a structure in which an engagement member is secured to the rod, and the engagement inhibition means is detachably disposed with respect to the engagement member.

In this case, when the rod is moved forwards, the engagement member is moved forwards. When the engagement inhibition means and the engagement member are engaged with each other, the shifting apparatus cannot be moved.

Therefore, the driver is able to feel the delay in locking of the output shaft.

According to another aspect of the present invention, there is provided a parking apparatus of an automatic transmission having a structure in which the engagement member is formed as a cam.

In this case, since the cam of the parking apparatus can be used as the engagement member, the cost can be reduced and the general versatility can be improved.

According to another aspect of the invention, there is provided a parking apparatus of an automatic transmission having a structure in which the engagement member is formed as a guide portion for the rod.

In this case, since the guide portion of the parking apparatus can be employed as the engagement member, the cost can be reduced and the general versatility can be improved.

According to another aspect of the invention, there is provided a parking apparatus of an automatic transmission having a structure in which the engagement inhibition means is disposed between the parking gear and the parking pole and arranged to restrain swing motion of the parking pole.

According to another aspect of the invention, there is provided a parking apparatus of an automatic transmission including a parking gear, a parking pole disposed swingably and having a claw arranged to selectively be engaged with a tooth space of the parking gear, engagement inhibition means movably disposed and arranged to be moved to an inhibition position for inhibiting engagement between the claw and the tooth space and an inhibition release position for releasing inhibition of the engagement, and engagement inhibition release means for bringing the engagement inhibition means to the inhibition release position in accordance with a residual torque existing between the parking gear and drive wheels in a state where a vehicle is stopped.

In this case, when the vehicle is stopped and the shifting apparatus is operated to select the parking range so as to engage the claw and the tooth space, the engagement inhibition means inhibits the engagement between the claw and the tooth space.

The engagement inhibition release means brings the engagement inhibition means to the inhibition release position in accordance with the residual torque existing between the parking gear and the drive wheels. Therefore, the claw and the tooth space are engaged after the residual torque existing between the parking gear and the drive wheels has been released.

Therefore, undesirable lock of the output shaft in the state where the residual torque exists between the parking gear and the drive wheels can be prevented.

When the driver has attempted to run the vehicle again and thus the engagement between the claw and the tooth space has been released, generation of noise and shock can be prevented. Therefore, the driver does not feel uncomfortable.

According to another aspect of the invention, there is provided a parking apparatus of an automatic transmission having a structure further including residual-torque detection means for detecting a residual torque.

The engagement inhibition release means moves the engagement inhibition means from the inhibition position to the inhibition release position in accordance with the residual torque detected by the residual-torque detection means.

In this case, the residual torque is directly detected and the output shaft is locked after the residual torque has been sufficiently released. Therefore, this makes it possible to prevent the rapid release of residual torque existing between the parking gear and the drive wheels.

BRIEF DESCRIPTION OF THE DRAWINGS

The invention will be described with reference to the drawings, wherein.

DETAILED DESCRIPTION OF PREFERRED EMBODIMENTS

A best mode for carrying out the invention will now be described with reference to the drawings.

Figure 1:
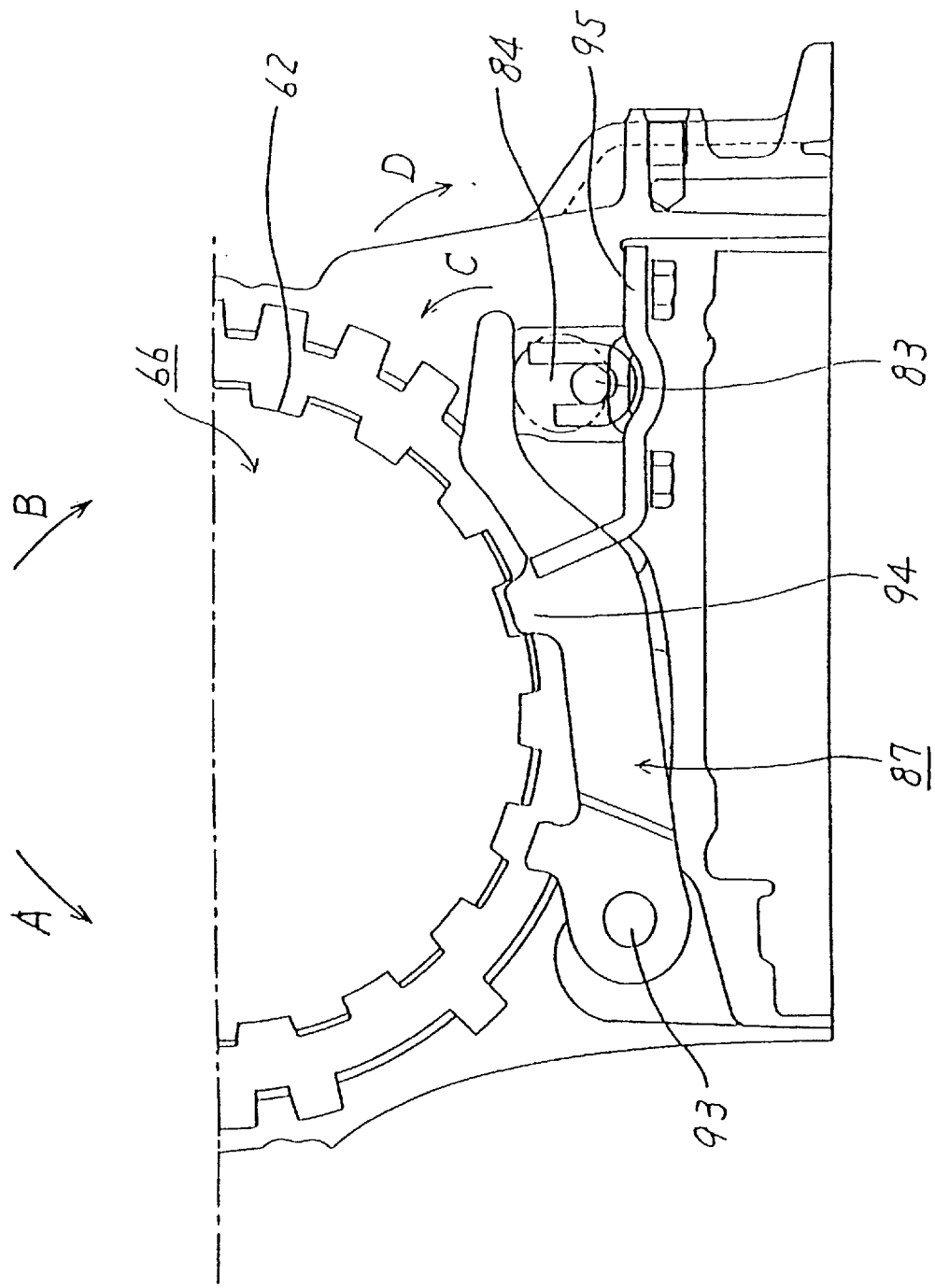
FIG. 1 is a front view showing a general parking apparatus of an automatic transmission.
Figure 2:
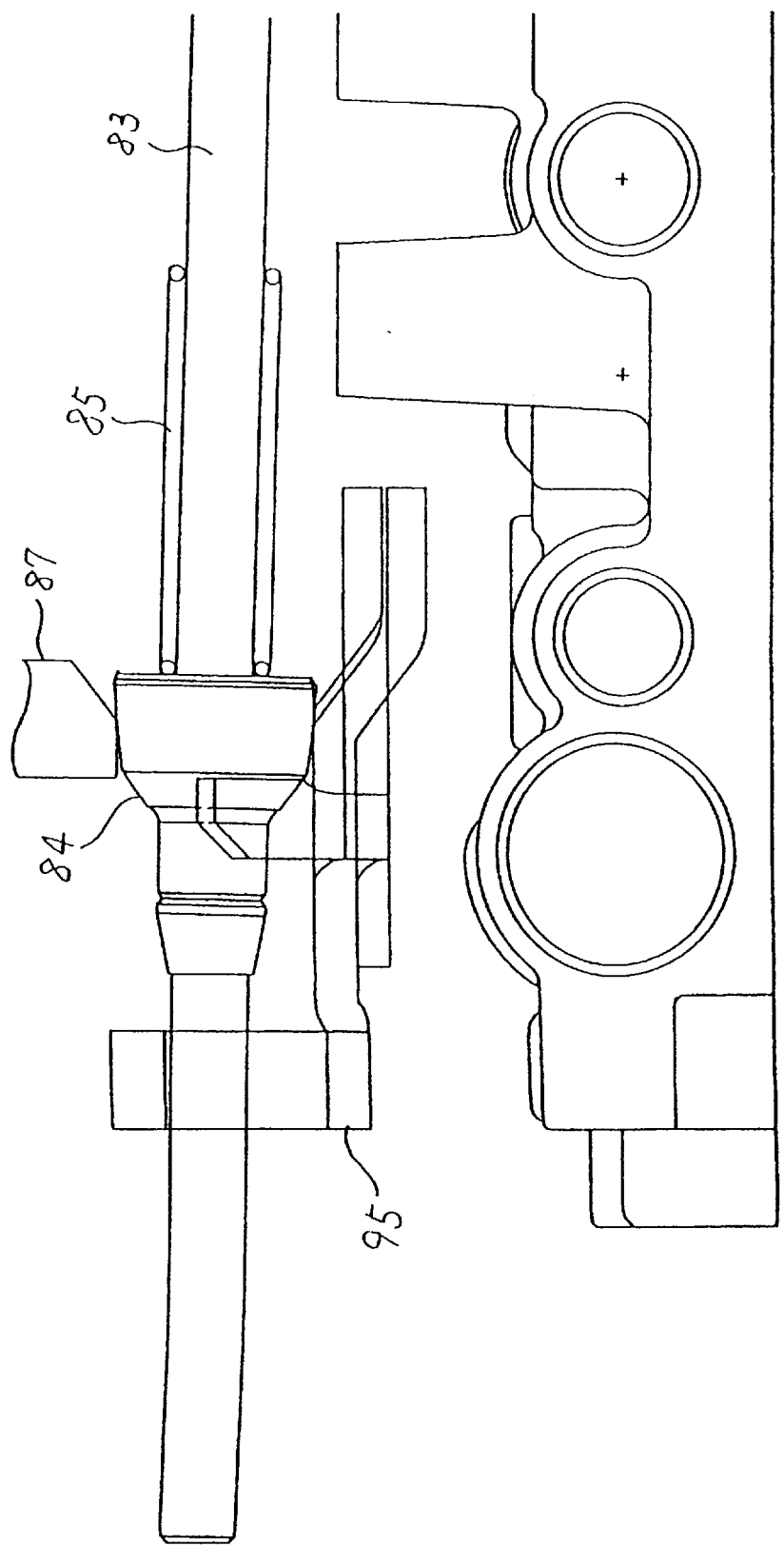
FIG. 2 is a side view showing the general parking apparatus of an automatic transmission.
Figure 3:
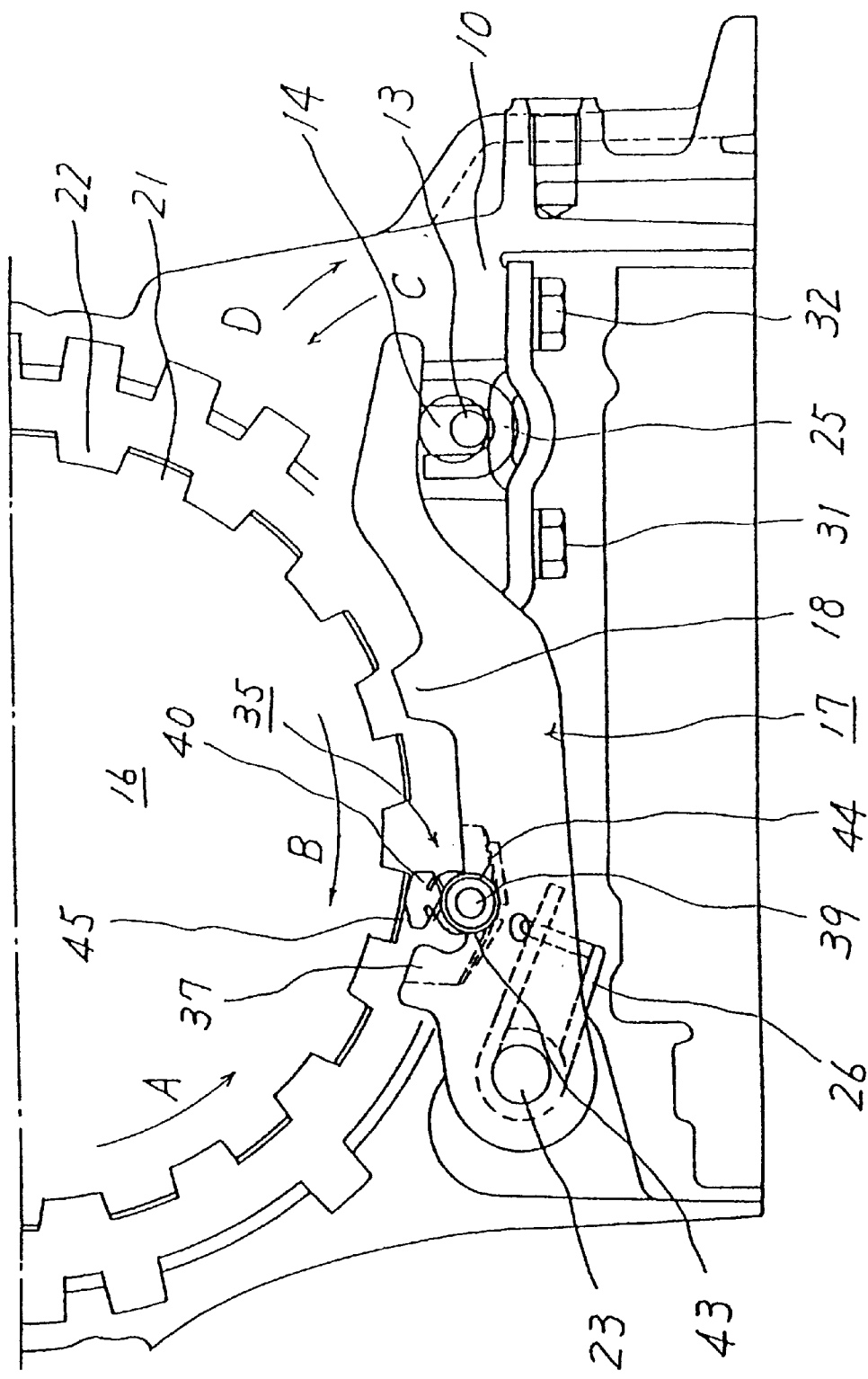
FIG. 3 is a front view showing a parking apparatus of an automatic transmission according to a first embodiment of the invention.
Figure 4:
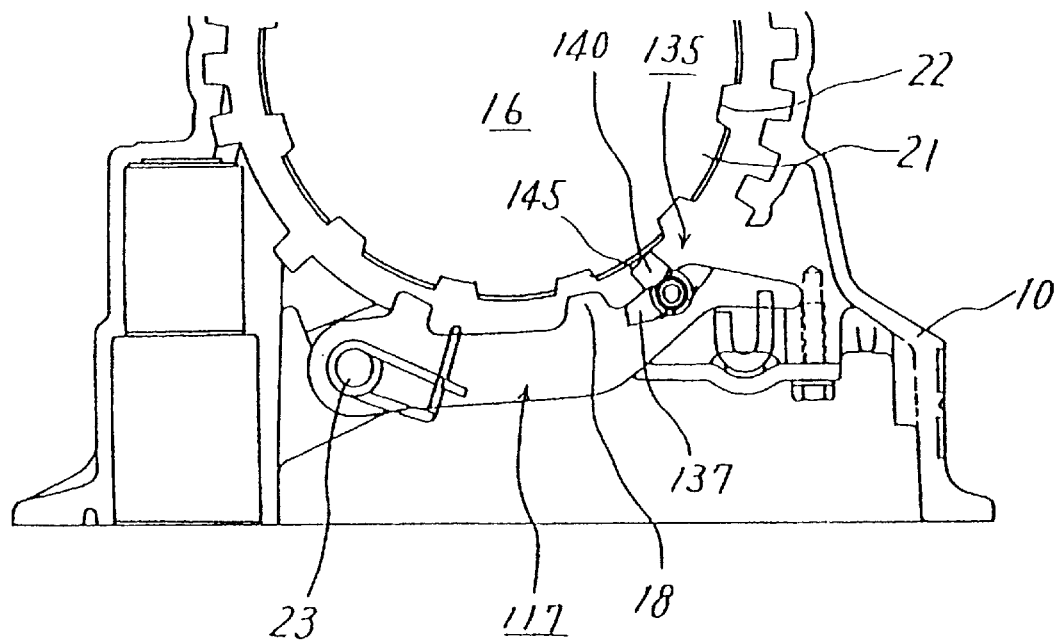
FIG. 4 is a diagram showing a first state of a parking apparatus of an automatic transmission according to a second embodiment of the invention.

FIG. 3 is a front view showing a parking apparatus of an automatic transmission according to a first embodiment of the invention.

Referring to FIG. 3, the parking apparatus of an automatic transmission incorporates a rod 13 arranged to be moved forwards/reversely by a detent lever (not shown); a cam 14 is slidably disposed at a predetermined position of the rod 13 to convert the linear motion into rotational motion; a parking pole 17 which is swung when the cam 14 has been moved forwards or reversely to be brought to an engagement position or a retraction position; and a parking gear 16 supported rotatively with respect to a casing 10.

The parking gear 16 is provided with a plurality of teeth 21 formed in the outer periphery thereof. Tooth places 22 are formed between the teeth 21. The parking gear 16 is connected to an output shaft of a vehicle engine and the drive wheels (not shown). When the vehicle is moved forwards, the parking gear 16 is rotated in a direction indicated by an arrow A upon rotation of the output shaft. When the vehicle is moved in reverse, the parking gear 16 is rotated in a direction indicated by an arrow B upon rotation of the output shaft. Thus, the parking gear 16 transmits the rotations of the output shaft to the drive wheels.

The parking pole 17 is supported so as to be capable of swinging about a pole shaft 23 serving as a swing shaft. A claw 18 having a shape corresponding to the tooth space 22 is formed at the substantially central portion of the parking pole 17. The claw 18 is so formed to be opposite to the parking gear 16. Therefore, the parking pole 17 is rotated in a direction indicated by an arrow C to be brought to the engagement position where the claw 18 and the tooth space 22 are engaged with each other. When the parking pole 17 is rotated in the direction indicated by an arrow D, the parking pole 17 is brought to the retraction position where the claw 18 and the tooth space 22 is disengaged. Note that the pole shaft 23 is provided with a torsion spring 26. The torsion spring 26 urges the parking pole 17 in the direction indicated by the arrow D.

The detent lever is formed as a plate-like member connected to a manual shaft (not shown) and arranged to rotate about the manual shaft. Moreover, the detent lever is rotated in synchronization with the operation of a shifting apparatus (not shown) disposed in a driver's seat, for example, the operation of a shift lever. A plurality of engagement grooves corresponding to the shifting positions of the shift lever are formed in the peripheral portion of the detent lever. Any one of the engagement grooves and the leading end of the detent spring can be engaged with each other. Therefore, when the detent lever has been rotated by operating the shift lever, the rod 13 follows the rotation of the detent lever so as to be moved forwards or reversely. When the shift lever is operated, any one of a forward drive range, a reverse drive range, a neutral range or a parking range can be selected.

A compression spring (not shown) is provided forward of the cam 14 of the rod 13. The detent lever uses the urging force of the compression spring to move the rod 13 forwards. Note that the cam 14 is provided with a conical surface formed into two steps and facing the forward direction of the rod 13.

When the rod 13 is moved forward, the cam 14 is introduced into a position between the leading end of the parking pole 17 and a bracket 25. Thus, the parking pole 17 is moved upwards so as to be rotated in the direction indicated by the arrow C. When the rod 13 is moved reversely, the cam 14 is separated from the position between the leading end of the parking pole 17 and the bracket 25. Thus, the parking pole 17 is rotated in the direction indicated by the arrow D by the urging force of the torsion spring 26. Note that the bracket 25 is secured to the casing 10 with bolts 31, 32.

With the parking apparatus of an automatic transmission having the above-mentioned structure, an attempt to stop and park the vehicle which is being moved in the forward drive range or the reverse drive range requires the driver to depress a brake pedal (not shown) to stop the vehicle. Then, the driver operates the shift lever so as to select the parking range.

As a result, a stop state of the vehicle may stop the drive wheels, the output shaft, the parking gear 16 and the like. On the other hand, the detent lever is rotated in synchronization with the shift lever. Thus, the rod 13 is moved forwards to follow the rotation of the detent lever. When the rod 13 has been moved forwards, the parking pole 17 is rotated in the direction indicated by the arrow C.

As described above, the parking pole 17 is rotated in the direction indicated by the arrow C so as to establish the engagement between the claw 18 and one of the tooth spaces 22. Thus, the output shaft is locked.

Since the driver has not operated an acceleration pedal (not shown) at the moment when the drive wheels have been stopped by depression of the brake pedal, the engine (not shown) is in an idling state. As the engine and the drive wheels are connected with each other through a torque converter, a transmission and the like (not shown), the torque generated by the engine causes the drive wheels to be rotated. Therefore, the output shaft and the parking gear 16 are caused to be rotated in the direction indicated by the arrow A or the arrow B.

Therefore, when the driver operates the shift lever to select the parking range simultaneously with depression of the brake pedal to stop the drive wheels, engagement between the claw 18 and the tooth spaces 22 in a state in which the parking gear 16 is caused to be rotated in the direction indicated by the arrow A or the arrow B, that is, in a state in which the drive force (the torque) is provided, causes the output shaft to undesirably be locked in a state in which the residual torque is retained between the parking gear 16 and the drive wheels.

In the foregoing case, the output shaft is locked in the state in which the residual torque is retained between the parking gear 16 and the drive wheels. Therefore, if the driver operates the shift lever to select another range in order to drive the vehicle, the residual torque between the parking gear 16 and the drive wheels is rapidly discharged. As a result, noise and shock are generated, and the driver may feel uncomfortable.

Therefore, the parking pole 17 is provided with a stopper 35 serving as engagement inhibition means. The stopper 35 is formed of a swinging member 40 and coil springs 43, 44. The stopper 35 is brought to an inhibition position or an inhibition-release position. At the inhibition position, the stopper 35 inhibits engagement of the claw 18 with the tooth space 22. At the inhibition-release position, the stopper 35 permits engagement of the claw 18 with the tooth space 22.

Therefore, the parking pole 17 is provided with a recess, for example, a groove 37, in a surface thereof opposite to the parking gear 16. The groove 37 is formed radially inwardly of the claw 18, by which a portion of the stopper 35 is accommodated. A pin 39 is disposed in the substantially central portion of the groove 37 and arranged to swingably support the swinging member 40. In the foregoing case, the pin 39 is formed separately from the parking pole 17. Therefore, the parking pole 17 can be formed by pressing or the like, resulting in reduced cost. The pin 39 constitutes an engagement inhibition release means.

The swinging member 40 is provided with a pair of coil springs 43, 44 serving as restoring means for urging the swinging member 40 in opposite directions and restoring the stopper 35 when the parking pole 17 is at the retraction position. Therefore, if the parking pole 17 is moved from the engagement position where no external force is exerted, the swinging member 40 stands straight toward the center of the parking gear 16 by the urging force of the coil springs 43, 44. When the external force is exerted on the swinging member 40, the swinging member 40 is rotated about the pin 39 against the urging force of the coil springs 43, 44 so as to be accommodated in the groove 37.

An arc-shaped contact surface 45 formed concentrically with the pin 39 is defined at the leading end of the swinging member 40. The height of the swinging member 40 is determined such that the contact surface 45 and the leading end surface of the tooth 21 can be brought into contact with each other without generating sliding motion when the swinging member 40 stands straight toward the center of the parking gear 16. Note that the height of the claw 18 is determined such that the claw 18 does not come in contact with the parking gear 16 in the above-mentioned state.

Therefore, when the parking gear 16 has been rotated and thus no residual torque exists to bring the tooth 21 to a position corresponding to the swinging member 40, the contact surface 45 and the front surface of the tooth 21 are brought into contact with each other without generating sliding motion. Thus, the swinging member 40 is rotated in synchronization with the rotation of the parking gear 16. When the parking gear 16 has been further rotated to bring the tooth space 22 to a position corresponding to the swinging member 40, the contact surface 45 is separated from the front surface of the tooth 21. As a result, the swinging member 40 stands straight by the urging force of the coil springs 43, 44. Thus, the stopper 35 is restored.

Assuming that the tooth pitch (the distance between the centers of the teeth 21) of the parking gear 16 is p and the distance from the center of the front surface of the claw 18 to the center of the front surface of the contact surface 45 is L, the structure is formed to satisfy the following equation:

$$L \doteqdot (n+0.5) \cdot p (n \text{ is a positive integer})$$

In this embodiment, the following relationship is satisfied:
$$L \doteqdot 1.5p$$

Therefore, when the vehicle has been stopped and thus the parking gear 16 stops rotating, either of the claw 18 or the swinging member 40 is brought to the position corresponding to the tooth space 22. That is, when the tooth 21 has been brought to the position corresponding to the claw 18, the tooth space 22 is brought to the position corresponding to the swinging member 40. When the tooth 21 has been brought to the position corresponding to the swinging member 40, the tooth space 22 is brought to the position corresponding to the claw 18.

When the tooth 21 has been brought to the position corresponding to the swinging member 40 when the vehicle has been stopped and the parking gear 16 stops rotating, the contact surface 45 and the front surface of the tooth 21 are brought into contact with each other. Therefore, rotation of the parking pole 17 in the direction indicated by the arrow C is inhibited. Thus, the claw 18 and the tooth space 22 are not engaged with each other. Even if the rod 13 is moved forwards in the above-mentioned case, the cam 14 is not introduced into the position between the leading end of the parking pole 17 and the bracket 25. The position of the cam 14 is kept unchanged while compressing the compression spring.

When the drive wheels have been rotated because the vehicle has been moved, the rotations of the drive wheels are transmitted to the parking gear 16. The swinging member 40 is rotated in synchronization with the rotation of the parking gear 16. In the foregoing case, rotation of the parking pole 17 in the direction indicated by the arrow C is inhibited during a period when the contact surface 45 and the front surface of the tooth 21 are in contact with each other. When the edge portion of the contact surface 45 has reached the leading edge of a tooth 21, the rotation of the parking pole 17 in the direction indicated by the arrow C cannot be inhibited by the swinging member 40. The rotation of the parking gear 16 causes the tooth 21 to be brought to the position corresponding to the claw 18. Therefore, contact between the leading surface of the claw 18 and the leading surface of the tooth 21 is started so that the rotation of the parking pole 17 in the direction indicated by the arrow C is inhibited.

When the parking gear 16 has rotated further and thus the tooth space 22 has been brought to the position corresponding to the claw, 18, front surfaces of the claw 18 and the tooth 21 do not contact with each other. As a result, inhibition of the rotation of the parking pole 17 in the direction indicated by the arrow C is released.

Therefore, the cam 14 is moved forwards by urging force of the compression spring so that the claw 18 and the tooth space 22 are engaged with each other.

When the claw 18 is brought to the position corresponding to the tooth 21 after the vehicle has been stopped and thus the parking gear 16 stops rotating, the front surfaces of the claw 18 and the tooth 21 are brought into contact with each other. Therefore, rotation of the parking pole 17 in the direction indicated by the arrow C is inhibited. Thus, the claw 18 and the tooth space 22 are not engaged with each other. Also in this case, the cam 14 is not introduced into the position between the leading end of the parking pole 17 and the bracket 25. The position of the cam 14 is kept unchanged while compressing the compression spring.

When the drive wheels have been rotated by an attempt of the driver to move the vehicle and the rotations of the drive wheels have been transmitted to the parking gear 16, the rotation of the parking pole 17 in the direction indicated by the arrow C is inhibited during a period when the front surface of the claw 18 and the front surface of the tooth 21 are in contact with each other. Therefore, the claw 18 and the tooth space 22 are not engaged with each other.

When the tooth space 22 has been brought to the position corresponding to the claw 18, the front surfaces of the claw 18 and the tooth 21 are no longer in contact. Therefore, inhibition of the rotation of the parking pole 17 in the direction indicated by the arrow C is released. In this case, the tooth 21 is brought to the position corresponding to the swinging member 40 in synchronization with the rotation of the parking gear 16. Therefore, the contact between the contact surface 45 and the front surface of the tooth 21 is started. As a result, rotation of the parking pole 17 in the direction indicated by the arrow C is inhibited.

When the parking gear 16 is further rotated and the leading surface of the tooth 21 reaches the edge portion of the contact surface 45, the rotation of the parking pole 17 in the direction indicated by the arrow C cannot be inhibited by the swinging member 40. Therefore, the urging force of the compression spring causes the cam 14 to move forwards so that the claw 18 and the tooth space 22 are engaged with each other.

When the vehicle has been stopped and the parking gear 16 stops rotating as described above, the engagement between the claw 18 and the tooth space 22 is inhibited until the parking gear 16 rotates by a predetermined amount. Therefore, the output shaft is not locked in the state where the residual torque exists between the parking gear 16 and the drive wheels.

Even if the driver attempts to drive the vehicle and operates the shift lever to release the parking range, generation of noise and shock is prevented. Thus, the driver does not feel uncomfortable.

When the forward drive range or the reverse drive range has been selected by operating the shift lever, the parking pole 17 is brought to the retraction position by the position of the rod 13 and the cam 14. Moreover, the stopper 35 is restored to the inhibiting position by the coil springs 43, 44. Therefore, engagement between the claw 18 and the tooth space 22 can reliably be inhibited when the parking range is selected again.

The groove 37 is formed in the surface of the parking pole 17 opposite to the parking gear 16 for accommodating a portion of the swinging member 40. Therefore, the axial size of the parking apparatus of an automatic transmission can be reduced.

Since the amount of rotation of the parking gear 16 which is performed until engagement between the claw 18 and the tooth space 22 is, at the most, approximately a pitch p between teeth 21, the distance for which the vehicle is moved may significantly be reduced until the output shaft is locked.

A second embodiment of the present invention will now be described.

FIGS. 4–7 are diagrams showing first-fourth states respectively of a parking apparatus of an automatic transmission according to a second embodiment of the invention. Elements having the same structure as those according to the first embodiment are given the same reference numerals and are omitted from the description.

Referring to the drawings, reference numeral 10 represents a casing and 16 represents a parking gear. A plurality of teeth 21 and tooth spaces 22 are formed in the outer periphery of the parking gear 16. Reference numeral 23 represents a pole shaft serving as a swing shaft. Reference numeral 117 represents a parking pole. The parking pole 117 has a claw 18 and a recess, for example, a groove 137, formed in the surface thereof at a position opposite to the parking gear 16. The groove 137 is provided with a stopper 135 serving as an engagement inhibition means. Reference numeral 140 represents a swinging member constituting the stopper 135 and 145 represents a contact surface of the swinging member 140.

In this embodiment, when the parking gear 16 is caused to be rotated in a state where the parking pole 117 is at the engagement position, the portion between the pole shaft 23 of the parking pole 117 and the claw 18 is subject to stress. Because the groove 137 is formed radially outwardly of the claw 18 with respect to the pole shaft 23, a weak point where stress would be concentrated is avoided at the groove 137 which has a low durability.

Therefore, durability of the parking pole 117 can be improved.

The operation of the parking apparatus of an automatic transmission having the above-mentioned structure will now be described.

When the vehicle has been stopped and thus the parking gear 16 stops rotating, movement of the swinging member 140 to a position corresponding to the tooth 21 causes the contact surface 145 and the front surface of the tooth 21 to be brought into contact with each other. Therefore, the engagement between the claw 18 and the tooth space 22 can be inhibited.

Figure 5:
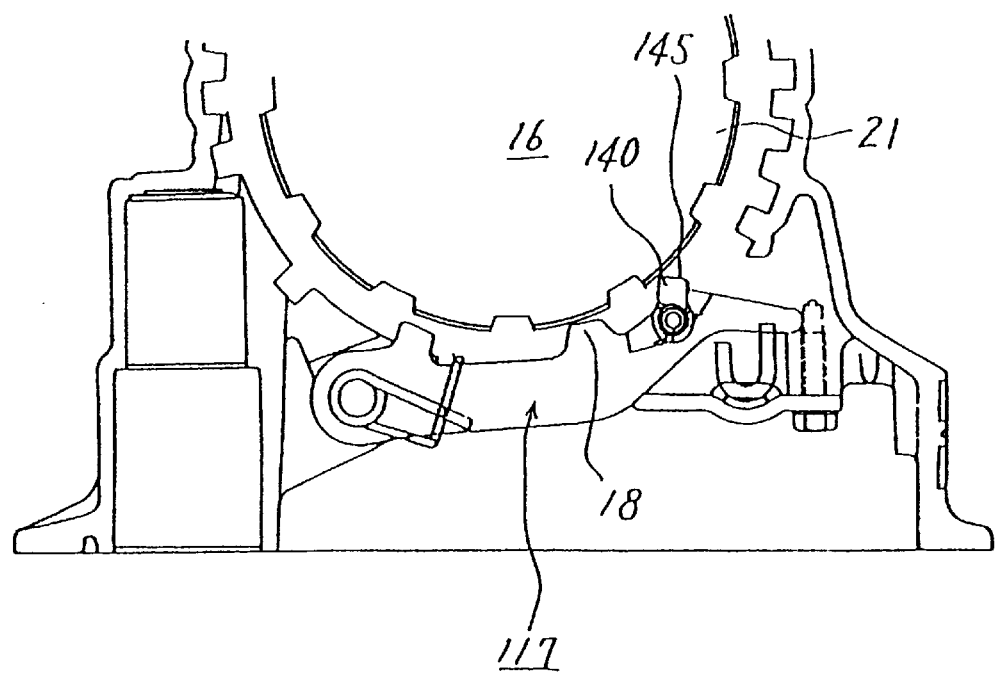
FIG. 5 is a diagram showing a second state of the parking apparatus of an automatic transmission according to the second embodiment of the invention.

When drive wheels (not shown) have been rotated by an attempt of the driver to move the vehicle and the rotations of the drive wheels have been transmitted to the parking gear 16, the swinging member 140 is rotated in synchronization with the rotation of the parking gear 16. In the foregoing case, rotation of the parking pole 117 is inhibited during a period when the contact surface 145 and the front surface of the tooth 21 are in contact with each other. When the edge portion of the contact surface 145 has arrived at a relationship with the front surface of the tooth 21 as shown in FIG. 5, the rotation of the parking pole 117 can no longer be inhibited by the swinging member 140. The rotation of the parking gear 16 brings the claw 18 to a position corresponding to a tooth 21. Therefore, contact between the front surface of the claw 18 and the front surface of the tooth 21 occurs and further rotation of the parking pole 117 is inhibited.

Figure 6:
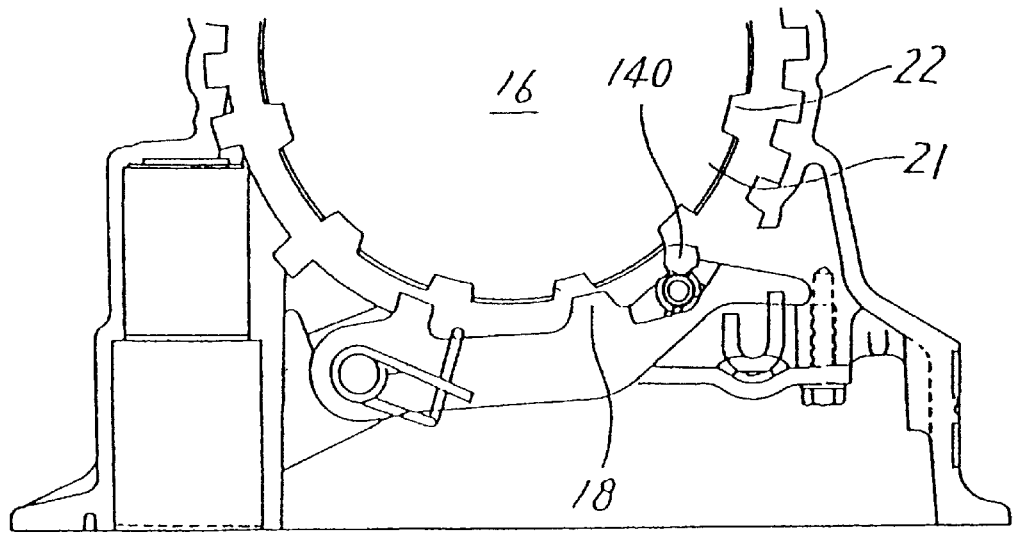
FIG. 6 is a diagram showing a third state of the parking apparatus of an automatic transmission according to the second embodiment of the invention.
Figure 7:
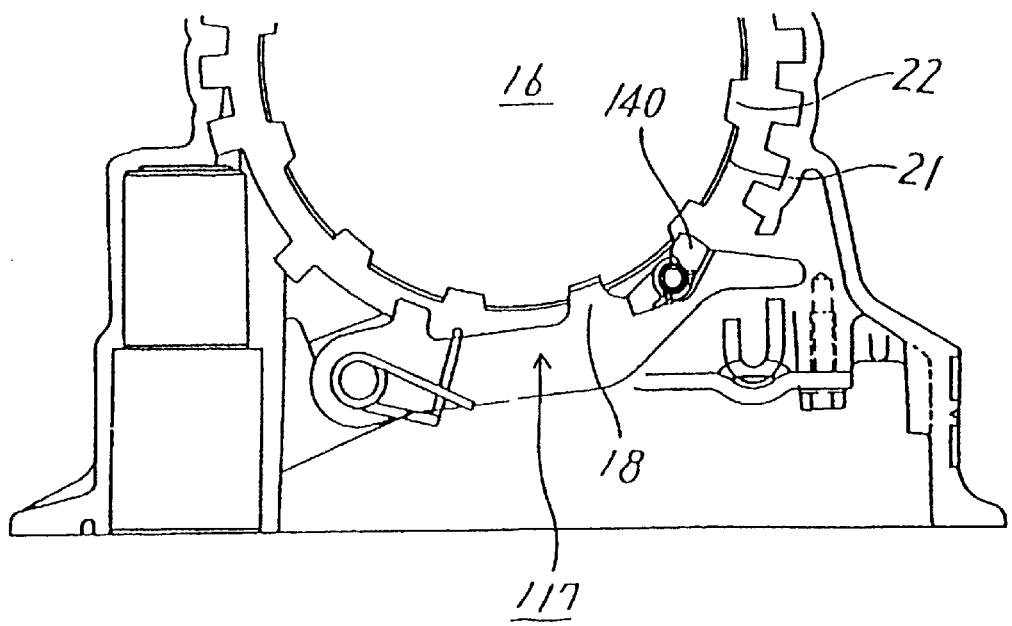
FIG. 7 is a diagram showing a fourth state of the parking apparatus of an automatic transmission according to the second embodiment of the invention.

When the parking gear 16 rotates further, as shown in FIG. 6, the claw 18 now substantially opposes a tooth space 22. As shown in FIG. 7, the front surfaces of the claw 18 and the tooth 21 no longer contact each other, i.e., the claw 18 opposes the tooth space 22. As a result, inhibition of the rotation of the parking pole 117 is released and the claw 18 and the tooth space 22 are engaged with each other.

Figure 8:
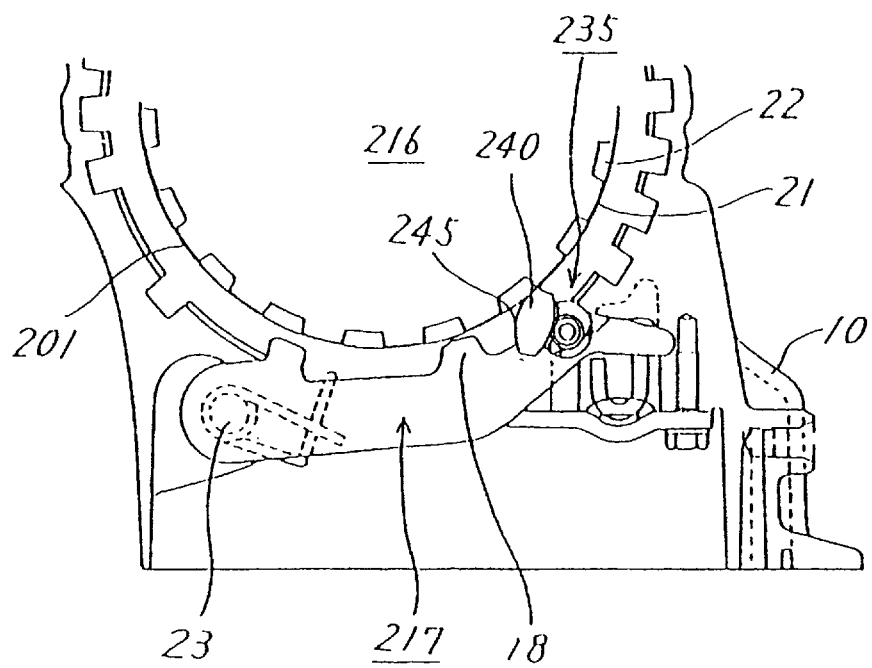
FIG. 8 is a diagram showing a first state of a parking apparatus of an automatic transmission according to a third embodiment of the invention.
Figure 9:
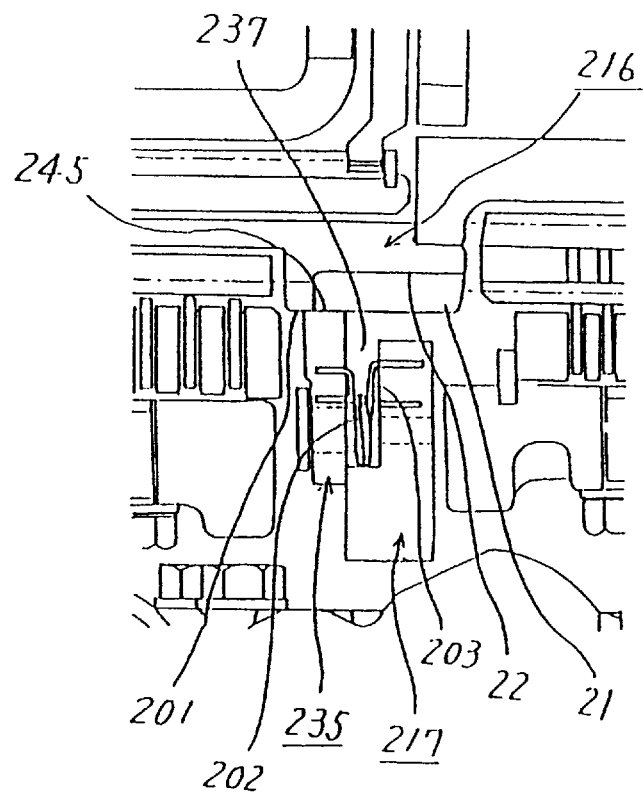
FIG. 9 is a side view showing the parking apparatus of an automatic transmission according to the third embodiment of the invention.
Figure 10:
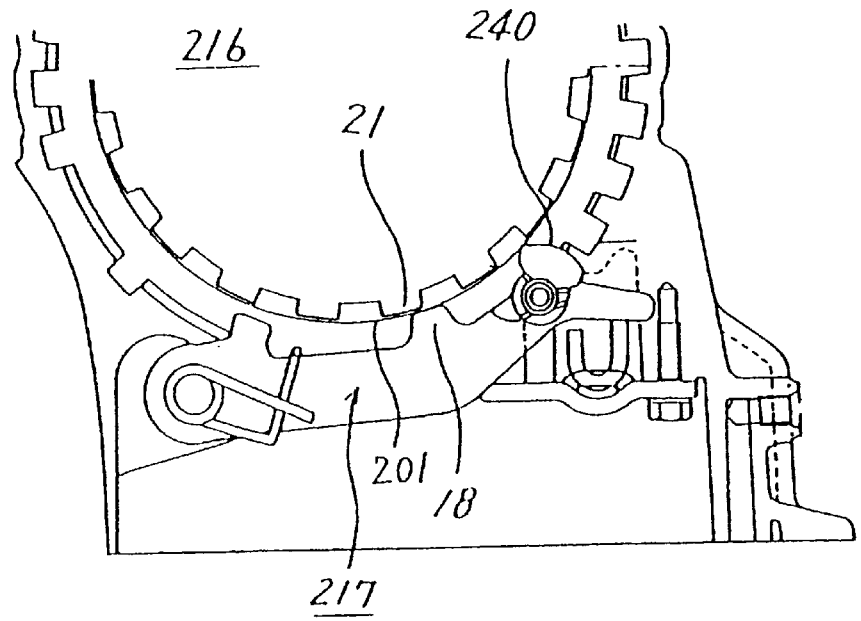
FIG. 10 is a diagram showing a second state of the parking apparatus of an automatic transmission according to the third embodiment of the invention.
Figure 11:
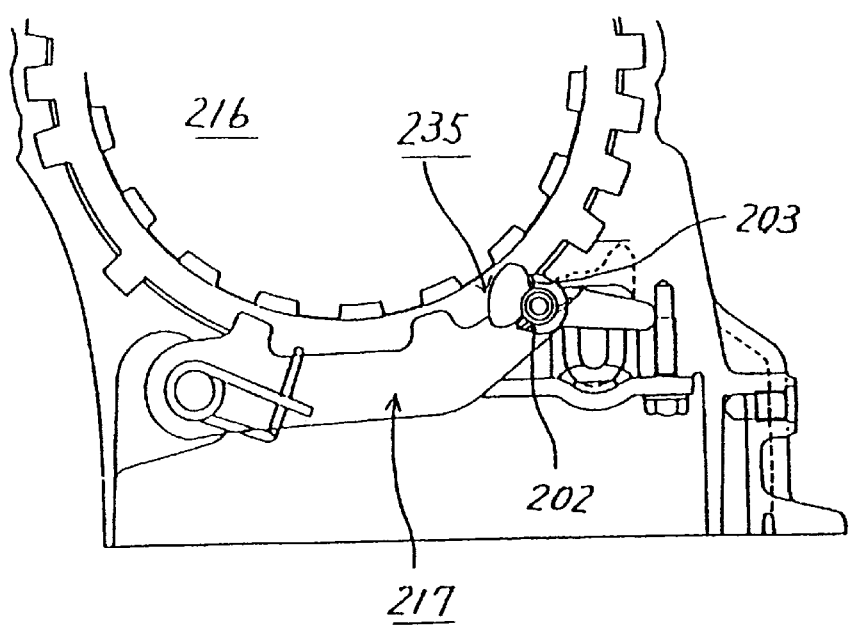
FIG. 11 is a diagram showing a third state of the parking apparatus of an automatic transmission according to the third embodiment of the invention.

A third embodiment of the present invention will now be described. FIGS. 8, 10 and 11 are diagrams showing first-third states of a parking apparatus of an automatic transmission according to a third embodiment of the invention and FIG. 9 is a side view showing the parking apparatus of an automatic transmission according to the third embodiment of the invention. Note that elements having the same structure as those according to the first embodiment are given the same reference numerals and the foregoing elements are substantially omitted from the description.

Referring to the drawings, reference numeral 10 represents a casing and 216 represents a parking gear. A plurality of teeth 21 and tooth spaces 22 are formed in the outer periphery of the parking gear 216. Reference numeral 23 represents a pole shaft serving as a swing shaft and 217 represents a parking pole. A stopper 235 serving as an engagement inhibition means is disposed adjacent to the parking pole 217.

Reference numerals 202, 203 represent coil springs and 237 represents a cut portion formed in the parking pole 217 for accommodating the coil springs 202, 203. Reference numeral 240 represents a swinging member and 245 represents a contact surface of the swinging member 240. The coil springs 202 and 203 and the swinging member 240 constitute the stopper 235.

In this embodiment, the parking gear 216 has a continuous contact surface 201 which is kept in contact with the swinging member 240 and formed adjacent to the tooth 21 and the tooth space 22.

As the contact between the swinging member 240 and the tooth 21 is therefore inhibited, durability of the parking gear 216 can be improved.

Because the swinging member 240 is disposed adjacent to the parking pole 217. Therefore, the size of the swinging member 240 can arbitrarily be determined by the greatest degree of freedom.

Therefore, if a great torque generated by an engine mounted on the vehicle causes a large residual torque to exist between the parking gear 216 and the drive wheels (not shown) when the parking pole 217 has been brought to the engagement position, the size of the stopper 235 can be enlarged to cope with the increase in the residual torque.

The operation of the parking apparatus of an automatic transmission having the above-mentioned structure will now be described.

When the vehicle has been stopped and thus the parking gear 216 stops rotating, the contact surface 245 of the swinging member 240 and the continuous contact surface 201 are brought into contact with each other as shown in FIG. 8. Therefore, engagement between the claw 18 and a tooth space 22 is inhibited.

When the drive wheels have been rotated by an attempt of the driver to move the vehicle and the rotations of the drive wheels have been transmitted to the parking gear 216, the swinging member 240 is rotated in synchronization with the rotation of the parking gear 216. In the foregoing case, the rotation of the parking pole 217 is inhibited during a period when the contact surface 245 and the continuous contact surface 201 are in contact with each other. When the edge, or side, portion of the contact surface 245 is rotated into position to contact the front surface of the continuous contact surface 201 as commenced to be shown in FIG. 10, inhibition of the rotation of the parking pole 217 by the swinging member 240 is released. In synchronization with the rotation of the parking gear 216, the tooth 21 is brought to the position corresponding to the claw 18. Therefore, contact between the front surfaces of the tooth 21 and the claw 18 is started while the rotation of the parking pole 217 remains inhibited.

When the parking gear 216 has been further rotated and thus the tooth space 22 has been brought to the position corresponding to the claw 18, the front surfaces of the tooth 21 and the claw 18 no longer contact with each other. Therefore, inhibition of the rotation of the parking pole 217 is released. As a result, the claw 18 and the tooth space 22 are engaged with each other.

When the driver has again selected the forward drive range or the reverse drive range, the parking pole 217 is brought to the retraction position and the tooth space 22 and the claw 18 are disengaged. As a result, the stopper 235 is brought to the inhibition position by the urging force of the coil springs 202, 203 as shown in FIG. 11.

A fourth embodiment of the invention will now be described.

Figure 12:
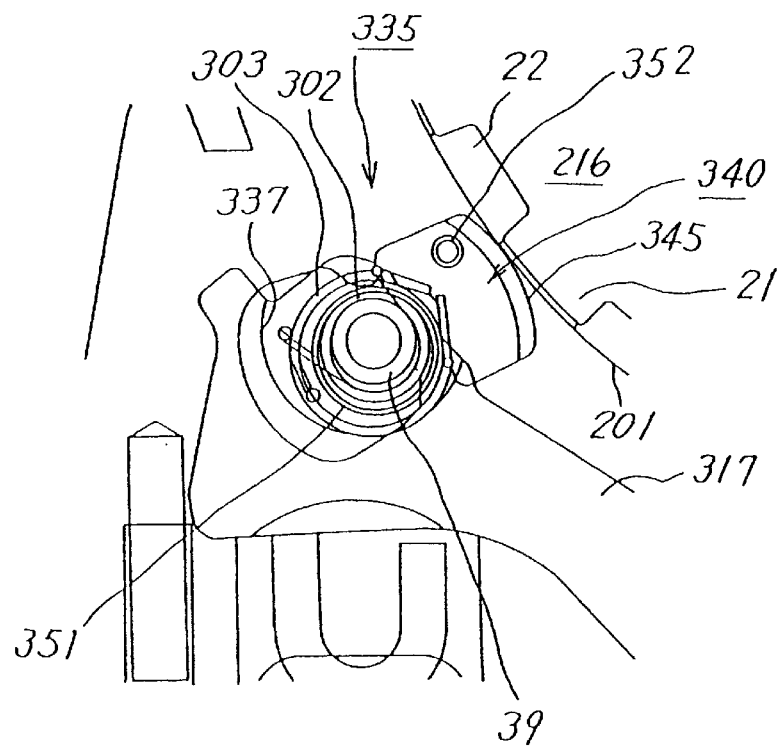
FIG. 12 is a front view showing an essential portion of a parking apparatus of an automatic transmission according to a fourth embodiment of the invention.
Figure 13:
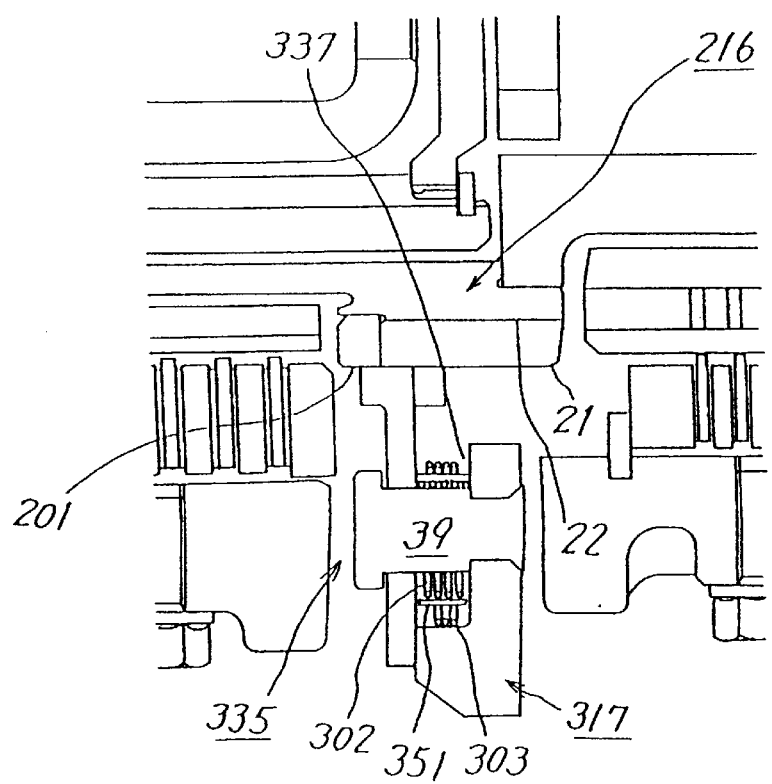
FIG. 13 is a side view showing an essential portion of the parking apparatus of an automatic transmission according to the fourth embodiment of the invention.
Figure 14:
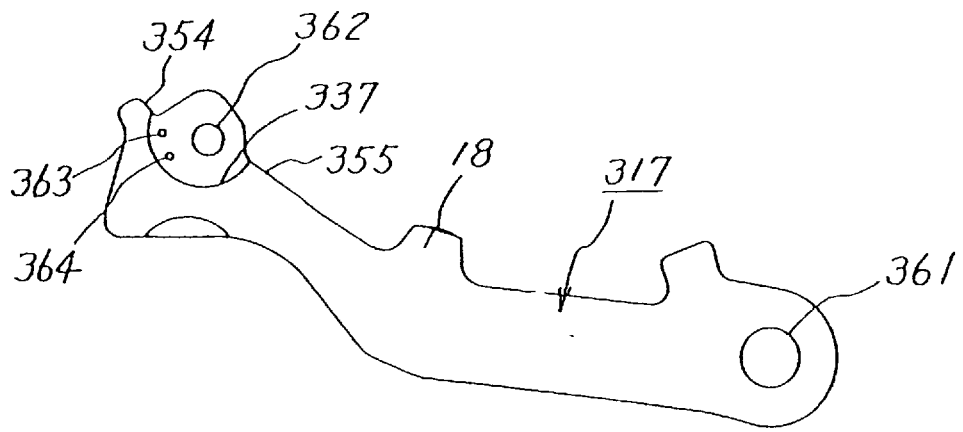
FIG. 14 is a front view showing a parking pole according to the fourth embodiment of the invention.
Figure 15:
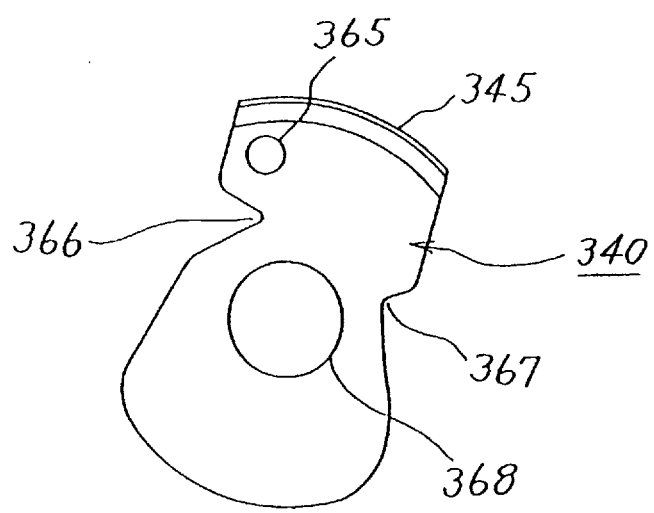
FIG. 15 is a front view showing a swinging member according to the fourth embodiment of the invention.
Figure 16:
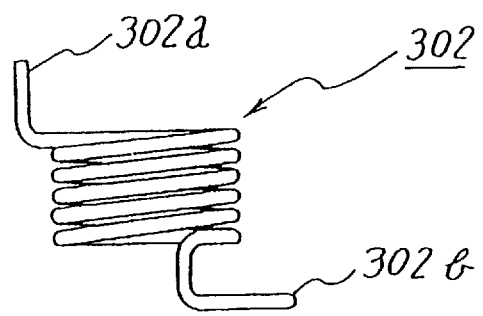
FIG. 16 is a front view showing, a first coil spring according to the fourth embodiment of the invention.
Figure 17:
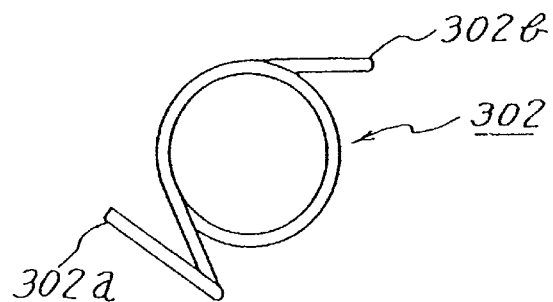
FIG. 17 is a plan view showing the first coil spring according to the fourth embodiment of the invention.
Figure 18:
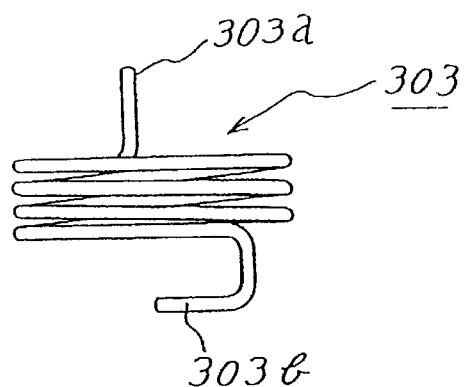
FIG. 18 is a front view showing a second coil spring according to the fourth embodiment of the invention.
Figure 19:
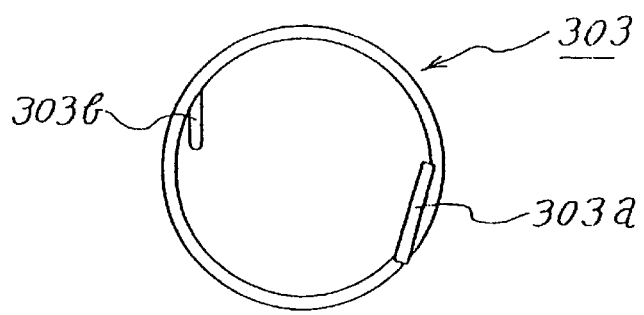
FIG. 19 is a plan view showing the second coil spring according to the fourth embodiment of the invention.
Figure 20:
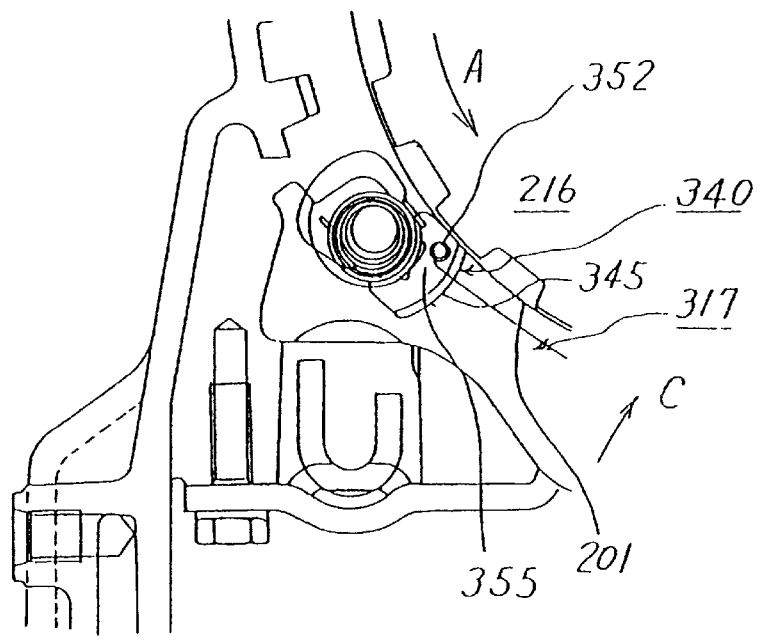
FIG. 20 is diagram showing a first state of the parking apparatus of an automatic transmission according to the fourth embodiment of the invention.
Figure 21:
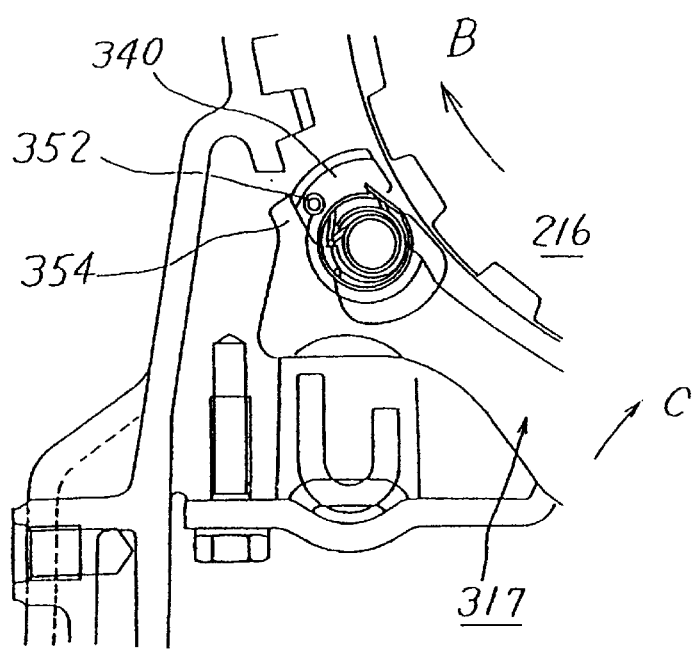
FIG. 21 is a diagram showing a second state of the parking apparatus of an automatic transmission according to the fourth embodiment of the invention.

FIG. 12 is a front view showing an essential portion of a parking apparatus of an automatic transmission according to a fourth embodiment of the invention. FIG. 13 is a side view showing the essential portion of the parking apparatus of an automatic transmission according to the fourth embodiment of the invention. FIG. 14 is a front view showing a parking pole according to the fourth embodiment of the invention. FIG. 15 is a front view showing a swinging member according to the fourth embodiment of the invention. FIG. 16 is a front view showing a first coil spring according to the fourth embodiment of the invention. FIG. 17 is a plan view showing the first coil spring according to the fourth embodiment of the invention. FIG. 18 is a front view showing a second coil spring according to the fourth embodiment of the invention. FIG. 19 is a plan view showing the second coil spring according to the fourth embodiment of the invention. FIG. 20 is a diagram showing a first state of the parking apparatus of an automatic transmission according to the fourth embodiment of the invention. FIG. 21 is a diagram showing a second state of the parking apparatus of an automatic transmission according to the fourth embodiment of the invention. Elements having the same structure as those according to the first embodiment are given the same reference numerals and the foregoing elements are omitted from description.

Referring to the drawings, reference numeral 216 represents a parking gear. A plurality of teeth 21 and tooth spaces 22 are formed in the outer periphery of the parking gear 216. Reference numeral 317 represents a parking pole. A stopper 335 serving as an engagement inhibition means is disposed adjacent to the parking pole 317. The stopper 335 is composed of the first and second coil springs 302, 303 and the swinging member 340.

Reference numeral 337 represents a cut portion provided in the parking pole 317 for accommodating the first and second coil springs 302, 303. Reference numeral 345 represents a contact surface of the swinging member 340. Reference numeral 351 represents a cylindrical guide member. Reference numeral 352 represents a restraining pin joined to a comer portion adjacent to the contact surface 345 and arranged to restrain the rotation of the swinging member 340. In this embodiment, the first and second coil springs 302, 303 and the cylindrical guide member 351 constitute the restoring means.

The restraining pin 352 is separately firmed from the swinging member 340. Therefore, the swinging member 340 can be formed by pressing or the like, resulting in cost reduction.

Moreover, the parking pole 317 has a shaft hole 361 through which the pole shaft 23 (see FIG. 3) serving as a swing shaft is allowed to pass; a pin hole 362 through which the pin 39 is allowed to pass; an engagement hole 363 through which an engagement end 302a of the first coil spring 302 is inserted; and an engagement hole 364 through with an engagement end 303a of the second coil spring 303 is inserted. The swinging member 340 has a pin hole 365 through which the restraining pin 352 is allowed to pass; an engagement portion 366 to which another engagement end 302b of the first coil spring 302 is engaged; an engagement portion 367 to which another engagement end 303b of the second coil spring 303 is engaged; and a pin hole 368 through which the pin 39 is allowed to pass. Note that the pin 39 constitutes the engagement inhibition release means.

In the foregoing case, the parking gear 216 has a continuous contact surface 201 arranged to be brought into contact with the swinging member 340 at a position adjacent to the tooth 21 and the tooth space 22.

Therefore, the swinging member 340 and the tooth 21 do not contact with each other. Therefore, durability of the parking gear 216 can be improved.

Since the swinging member 340 is disposed adjacent to the parking pole 317. Therefore, the size of the swinging member 340 can be determined with the greatest degree of freedom.

Therefore, if a great torque generated by an engine (not shown) mounted on the vehicle results in a large residual torque between the parking gear 216 and the drive wheels (not shown) when the parking pole 317 has been brought to the engagement position, the size of the stopper 335 can be enlarged to cope with the increase in the residual torque.

The first coil spring 302 has a diameter larger than that of the second coil spring 303. The second coil spring 303 is disposed radially outwardly of the first coil spring 302. Since a cylindrical guide member 351 is disposed between the first coil spring 302 and the second coil spring 303 in a radial direction, undesirable winding between the first coil spring 302 and the second coil spring 303 accompanied with swing motion of the swinging member 340 can be prevented.

When the parking pole 317 is rotated in the direction indicated by the arrow C (FIG. 20) during rotation of the parking gear 216 at a high speed, the contact surface 345 of the swinging member 340 which has been restored and stood straight as described above and the continuous contact surface 201 of the parking gear 216 are brought into contact with each other. The rotating parking gear 216 hits the swinging member 340 (a ratchet action), thus deteriorating durability of the stopper 335.

Therefore, the parking pole 317 is provided with stoppers 354, 355 adjacent to the cut portion 337. When the restraining pin 352 is brought into contact with the stoppers 354, 355 upon swinging motion of the swinging member 340, further rotation of the swinging member 340 is prevented.

That is, when the parking pole 317 is rotated in the direction indicated by the arrow C during high speed rotation of the parking gear 216 in the direction indicated by the arrow A, the swinging member 340 is hit by the rotating parking gear 216. Thus, the swinging member 340 is rotated clockwise when viewed in FIG. 20. When the restraining pin 352 is brought into contact with the stopper 355 in the above-mentioned state, the further rotation of the swinging member 340 is prevented.

When the parking pole 317 is rotated in the direction indicated by the arrow C during high speed rotation of the parking gear 216 in the direction indicated by the arrow B (FIG. 21), the swinging member 340 is hit by the rotating parking gear 216. Thus, the swinging member 340 is rotated counterclockwise when viewed in FIG. 21. When the restraining pin 352 is brought into contact with the stopper 354 in the above-mentioned state, further rotation of the swinging member 340 is prevented.

Even if the swinging member 340 is hit by the rotating parking gear 216 as described above, the rotation of the swinging member 340 is prevented by the restraining pin 352 and the stoppers 354, 355. Therefore, durability of the stopper 335 can be improved.

A fifth embodiment of the invention will now be described.

Figure 22:
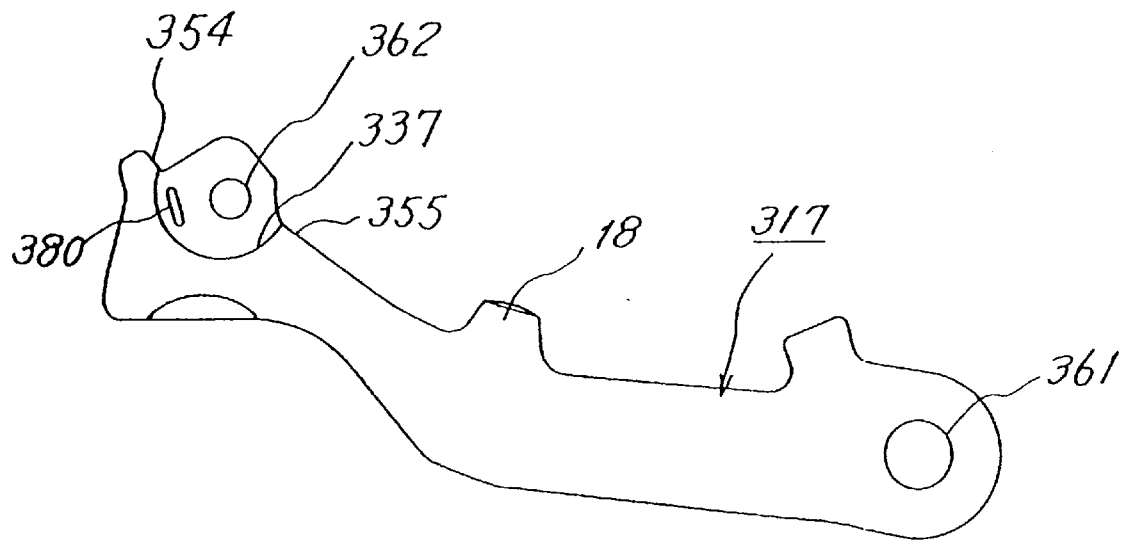
FIG. 22 is a front view showing a parking pole according to a fifth embodiment of the invention.
Figure 23:
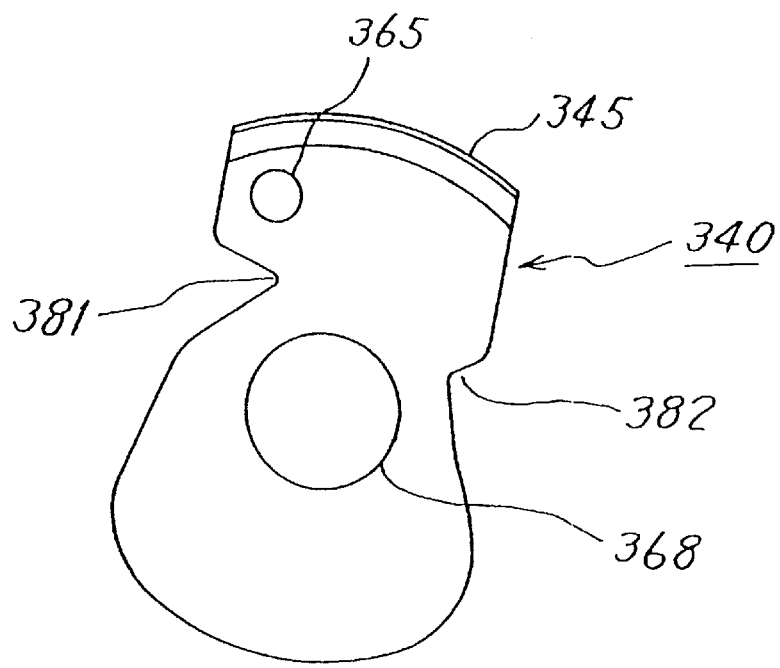
FIG. 23 is a front view showing a swinging member according to the fifth embodiment of the invention.
Figure 24:
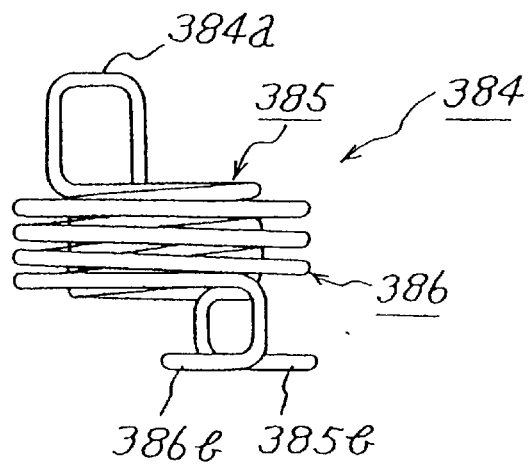
FIG. 24 is a front view showing a coil spring according to the fifth embodiment of the invention.
Figure 25:
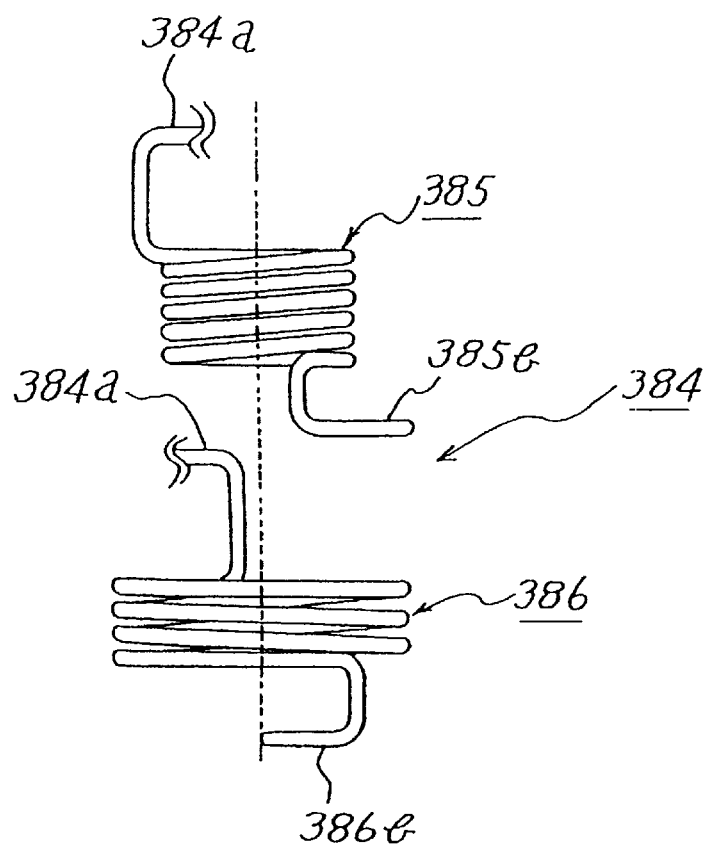
FIG. 25 is an exploded view showing the coil spring according to the fifth embodiment of the invention.

FIG. 22 is a front view showing a parking pole according to the fifth embodiment of the present invention. FIG. 23 is a front view showing a swinging member according to the fifth embodiment of the present invention. FIG. 24 is a front view showing a coil spring according to the fifth embodiment of the present invention. FIG. 25 is an exploded view showing the coil spring according to the fifth embodiment of the present invention. Elements having the same structures as those according to the fourth embodiment are given the same reference numerals and the foregoing elements are omitted from description.

Referring to the drawings, reference numeral 317 represents a parking pole, 340 represents a swinging member and 384 represents a coil spring serving as a restoring means. The coil spring 384 is formed integrally by connecting the first and second coil springs 385, 386 in series. Note that the swinging member 340 and the first and second coil springs 385, 386 constitute the stopper 335 (see FIG. 12).

The parking pole 317 has a shaft hole 361 through which the pole shaft 23 (see FIG. 3) serving as the swing shaft is allowed to pass, a pin hole 362 through which the pin 39 is allowed to pass and an engagement hole 380 into which a connecting portion 384a is inserted. The engagement hole 380 is arranged to establish the connection between the first coil spring 385 and the second coil spring 386. The swinging member 340 has a pin hole 365 through which the restraining pin 352 is allowed to pass, an engagement portion 381 to which an engagement end 385b of the first coil spring 385 is engaged, an engagement portion 382 to which an engagement end 386b of the second coil spring 386 is engaged and a pin hole 368 through which the pin 39 is allowed to pass.

Because the first coil spring 385 and the second coil spring 386 are, in this embodiment, connected with each other by the connecting portion 384a, undesirable winding between the first coil spring 385 and the second coil spring 386 formed upon swing motion of the swinging member 340 can be prevented. Since it is not required to dispose the guide member 351 between the first coil spring 385 and the second coil spring 386, the number of required elements can be reduced, resulting in a cost reduction.

A sixth embodiment of the invention will now be described.

Figure 26:
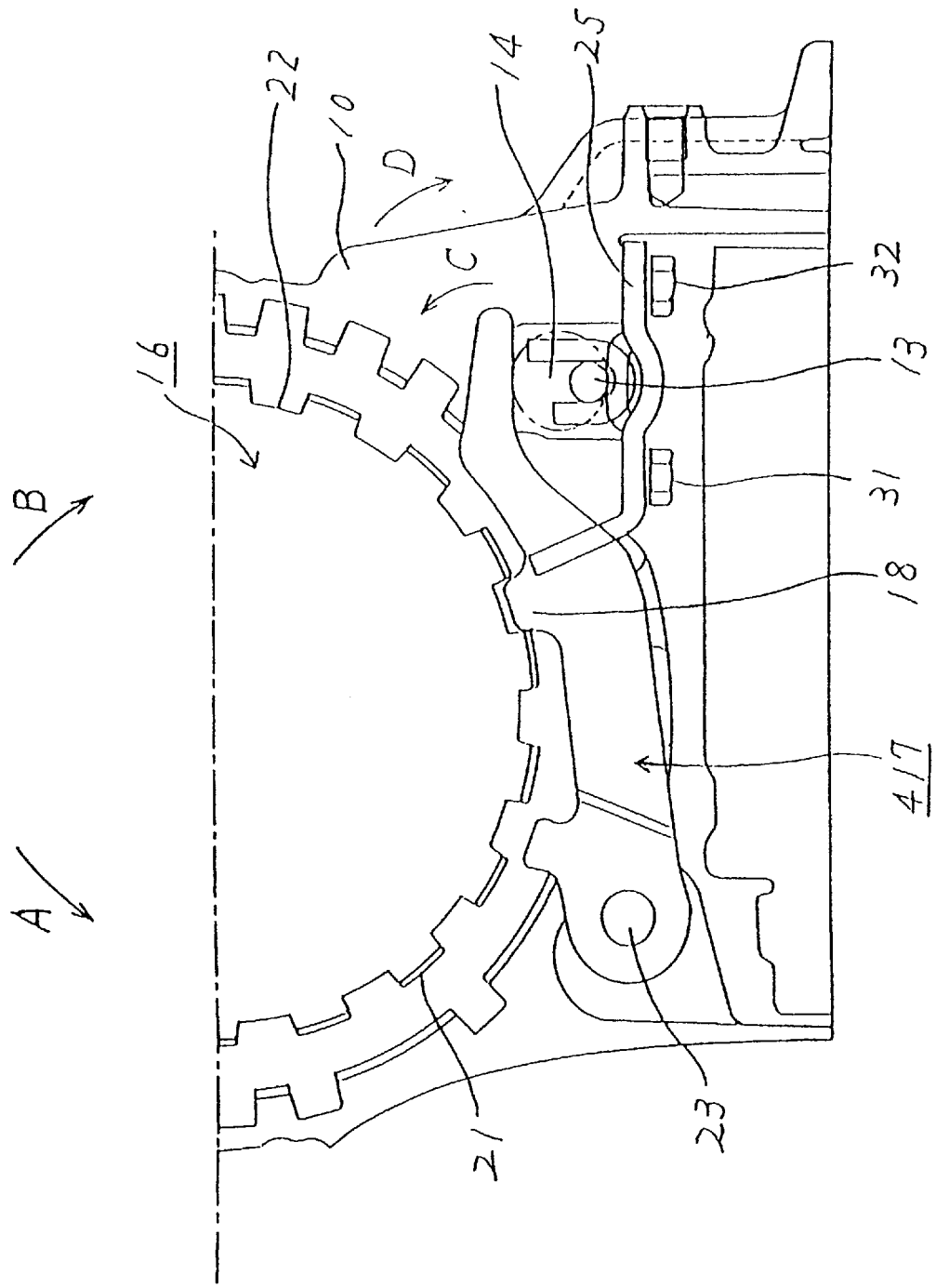
FIG. 26 is a front view showing a parking apparatus of an automatic transmission according to a sixth embodiment of the invention.
Figure 27:
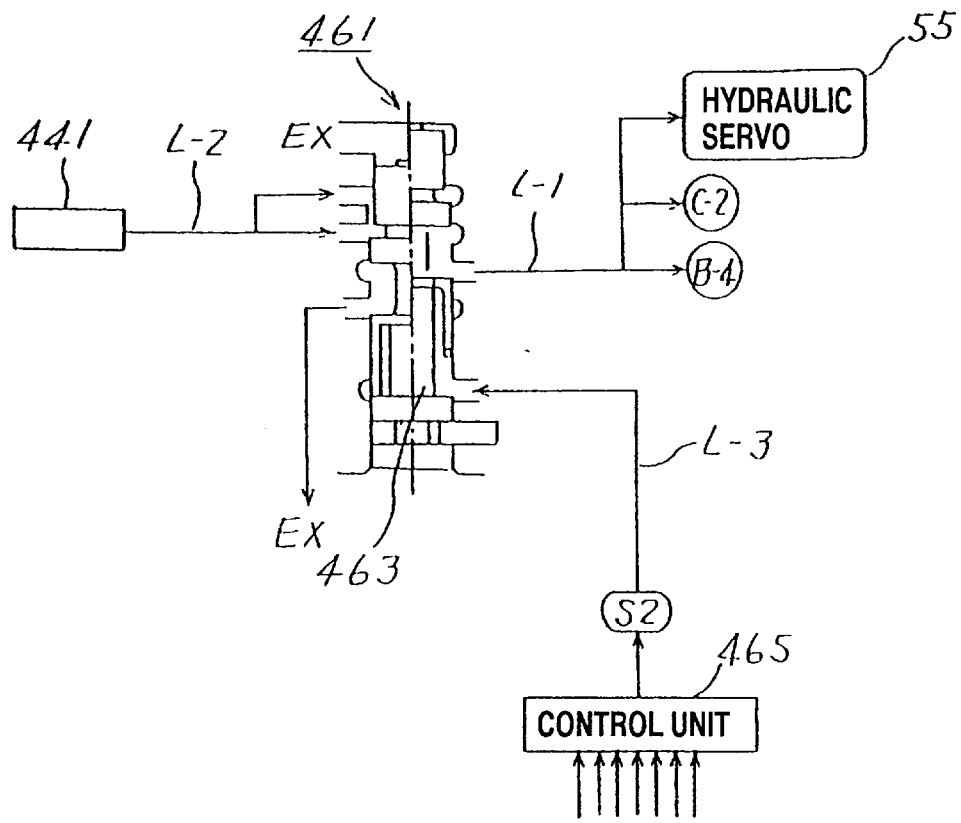
FIG. 27 is a hydraulic circuit diagram of an engagement inhibition release means according to the sixth embodiment of the invention.
Figure 28:
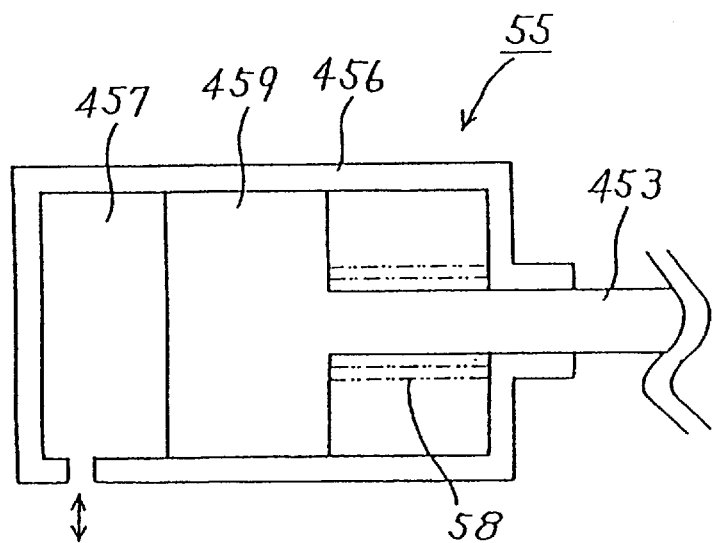
FIG. 28 is a diagram showing a hydraulic servo according to the sixth embodiment of the invention.
Figure 29:
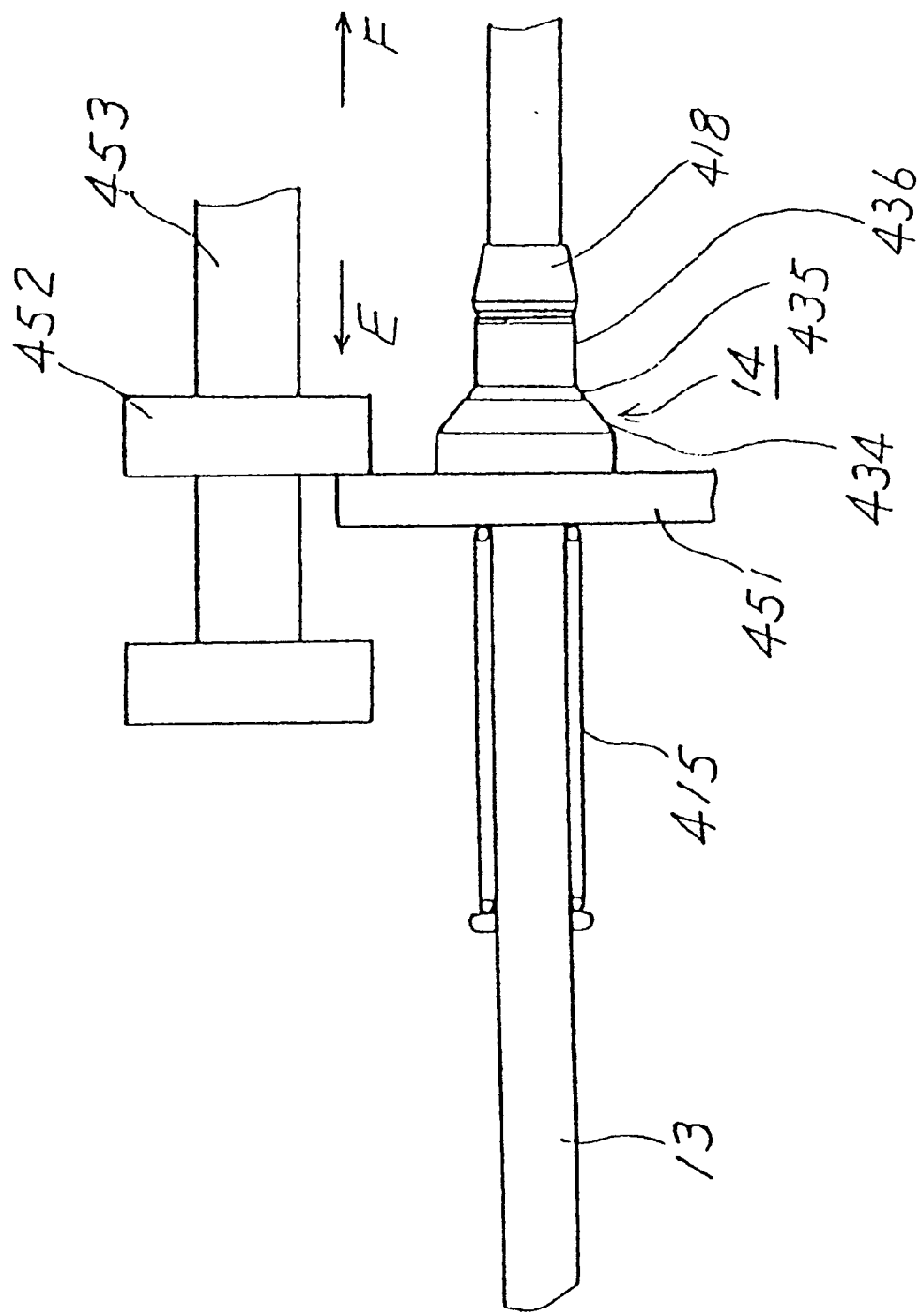
FIG. 29 is a side view showing the parking apparatus of an automatic transmission according to the sixth embodiment of the invention.

FIG. 26 is a front view showing a parking apparatus of an automatic transmission according to a sixth embodiment of the invention. FIG. 27 is a diagram showing a hydraulic circuit in an engagement inhibition release means according to the sixth embodiment of the invention. FIG. 28 is a diagram showing a hydraulic servo according to the sixth embodiment of the invention. FIG. 29 is a side view showing the parking apparatus of an automatic transmission according to the sixth embodiment of the invention. Elements having the same structure as those according to the first embodiment are given the same reference numerals and the foregoing elements are omitted from description.

The parking apparatus of an automatic transmission according to this embodiment incorporates a rod 13 which is moved forwards/reversely by a detent lever (not shown), a cam 14 slidably disposed at a predetermined position with respect to the rod 13 so as to convert linear motion into rotational motion, a support portion (not shown) for supporting the cam 14, a parking pole 417 swingably arranged so as to be brought to an engagement position or a retraction position, and a parking gear 16 supported rotatively with respect to the casing 10 and arranged to selectively be engaged with the claw 18 formed at a substantially central portion of the parking pole 417.

A plurality of teeth 21 and tooth spaces 22 are formed in the parking gear 16. The parking gear 16 is connected to an output shaft and drive wheels (not shown) so as to be rotated by the output shaft when the vehicle is moved forwards. Thus, the parking gear 16 is rotated in a direction indicated by an arrow A. Meanwhile the parking gear 16 is rotated in a direction indicated by an arrow B when the vehicle is moved in reverse. Thus, the parking gear 16 transmits the rotations to the drive wheels.

The parking pole 417 is supported swingably about the pole shaft 23 serving as the swing shaft. The claw 18 has a shape corresponding to the tooth space 22 and is formed in a substantially central portion of the parking pole 417 to be opposite to the parking gear 16. Therefore, when the parking pole 417 is rotated in the direction indicated by the arrow C, it is brought to the position where the claw 18 and the tooth space 22 are engaged with each other. When the parking pole 417 is rotated in the direction indicated by the arrow D, it is brought to the retraction position where the claw 18 and the tooth space 22 are disengaged. The aforementioned pole shaft 23 is provided with a torsion spring (not shown)for urging the parking pole 417 in the direction indicated by the arrow D.

The detent lever is formed of a plate-like member connected to a manual shaft (not shown) and arranged to rotate about the manual shaft. Moreover, the detent lever is rotated in synchronization with the operation of the shift lever (not shown) disposed at the driver's seat. A plurality of engagement grooves corresponding to the shift positions of the shift lever are formed in the peripheral portion of the detent lever. The engagement groove and the leading end of the detent spring (not shown) can be engaged with each other. Therefore, the operation of the shift lever to rotate the detent lever results in the rod 13 being moved forwards or reversely to follow the rotation of the detent lever. When the shift lever is operated, any one of the forward drive ranges, the reverse drive range, the neutral range or the parking range can be selected.

A compression spring 415 is provided for the rod 13 at a position in the rear (in a left-hand position in FIG. 29) of the cam 14, the compression spring 415 being disposed to surround the rod 13. A guide portion 418 formed into a truncated conical shape is provided for the cam 14 at a position further forwards (in a right-hand position in FIG. 29) of the cam 14. Therefore, the cam 14 is pressed against the guide portion 418 by the urging force of the compression spring 415. The cam 14 has conical surfaces 434, 435 formed into two steps and each having a vertex facing the forward direction of the rod 13. A cylindrical surface 436 is formed adjacent to the conical surface 435.

When the rod 13 is moved forwards (to the right (arrow F) shown in FIG. 29), the cam 14 is introduced into a position between the leading end of the parking pole 417 and the bracket 25. Thus, the cam 14 moves up the parking pole 417 to rotate in the direction indicated by the arrow C. When the rod 13 is moved reversely (to the left (arrow E) shown in FIG. 29), the cam 14 is separated from the position between the bracket 25 and the support portion of the parking pole 417. Thus, the parking pole 417 is rotated in the direction indicated by the arrow D by urging force of the torsion spring.

Since the driver does not operate an accelerator pedal (not shown) at a moment when a brake pedal (not shown) has been depressed and, thus, the drive wheels (not shown) have been stopped, the engine (not shown) is in an idling state. Since the engine and the drive wheels are connected to each other through a torque converter, a transmission and the like (not shown) in the idling state, the torque generated by the engine causes the drive wheels to be rotated. Therefore, the output shaft and the parking gear 16 are caused to be rotated in the direction indicated by the arrow A or B.

If the driver operates the shift lever to select the parking range substantially simultaneously with depression of the brake pedal and stop of the vehicle, the state where the parking gear 16 is rotated in the direction indicated by the arrow A or the arrow B, that is, the engagement between the claw 18 and the tooth space 22 in the state where the drive force is provided must be prevented. To achieve this, the engagement between the claw 18 and the tooth space 22 is delayed.

When the parking range has been selected by operating the shift lever, a predetermined friction engagement element is released. While the vehicle is running, for example, forwards, a forward drive clutch, that is, a first clutch is engaged. While the vehicle is running reversely, a reverse drive clutch, that is, a second clutch and a reverse drive brake, that is, a fourth brake is engaged.

When the moving vehicle is stopped upon depression of the brake pedal, the first clutch is released. Therefore, the engagement between the claw 18 and the tooth space 22 can be delayed until the first clutch is completely released after the parking range has been selected by operating the shift lever. When the moving vehicle is stopped upon depression of the brake pedal, the second clutch and the fourth brake are released. Therefore, the engagement between the claw 18 and the tooth space 22 can be delayed until the second clutch and the fourth brake are completely released after the parking range has been selected by the shift lever.

The operation portion of the shift lever is usually provided with the forward drive range position, the neutral range position, the reverse drive range position and the parking range position which are sequentially and adjacently disposed. Therefore, movement of the shift lever from the forward drive position to the parking range position requires passage of the neutral range position and the reverse drive range position. Therefore, time corresponding to the passage is further required.

Therefore, when the brake pedal is depressed and thus the vehicle which has been moving forwards is stopped, the engagement between the claw 18 and the tooth space 22 has been delayed at a moment when the shift lever has been moved from the forward drive range to the parking range.

On the other hand, movement of the shift lever from the reverse drive range position to the parking range position does not require time for passing other range positions.

Therefore, this embodiment has a structure such that the engagement between the claw 18 and the tooth space 22 is delayed only when the brake pedal has been depressed and thus the reversely running vehicle is stopped.

Therefore, an engagement member 451 is disposed at the rear end (at the left-hand end of FIG. 29) of the cam 14. Moreover, a restraining member 452 serving as an engagement inhibition means is disposed adjacent to the rod 13 such that engagement/disengagement with/from the engagement member 451 are allowed. The restraining member 452 is secured to a rod 453 so as to be, through the rod 453, connected to a hydraulic servo 55 constituting the engagement inhibition release means. The hydraulic servo 55 moves the restraining member 452 in a direction indicated by an arrow E so that the restraining member 452 is brought to the inhibition position, while the same moves the restraining member 452 in a direction indicated by an arrow F so that the restraining member 452 is brought to the inhibition release position.

Therefore, the hydraulic servo 55 is composed of a cylinder 456 and a piston 459 disposed in the cylinder 456 so as to move forwards and reversely and formed integrally with the rod 453. The piston 459 forms an oil chamber 457. When oil is supplied to the oil chamber 457, the rod 453 can be moved forwards (to the right in FIG. 28). When oil is discharged from the oil chamber 457, the rod 453 can be moved reversely (to the left in FIG. 28). To move the piston 459 reversely, a spring 58 is disposed closer to the rod 453 compared with the piston 459.

The hydraulic servo 55 and the reverse control valve 461 are connected with each other through an oil passage L-1. Meanwhile the reverse control valve 461 and the manual valve 441 are connected with each other through an oil passage L-2. A hydraulic servo C-2 of the second clutch and a hydraulic servo B4 of the fourth brake are connected to the oil passage L-1. The reverse control valve 461 has a control oil chamber 463 so that the reverse control valve 461 is brought to a left-half position when a signal hydraulic pressure has not been applied. The reverse control valve 461 is brought to a right-half position when the signal hydraulic pressure has been applied. When the reverse control valve 461 is located at the left-half position, the reverse control valve 461 releases the connection between the oil passages L-1 and L-2. When the reverse control valve 461 is located at the right-half position, the reverse control valve 461 establishes the connection between the oil passages-L-1 and L-2. Moreover, a solenoid valve S2 is connected to the control oil chamber 463 through the oil passage L-3. A solenoid (not shown) of the solenoid valve S2 is turned on or off by the control unit 465 so that the signal hydraulic pressure is generated.

Therefore, when the driver has operated the shift lever to select the reverse drive range, the control unit 465 turns the solenoid on so that the reverse control valve 461 is brought to the right-half position. Reverse drive range pressure generated by the manual valve 441 is supplied to the hydraulic servos C-2, B-4 through the oil passages L-2, L-1. As a result, the second clutch and the fourth brake are engaged and the reverse drive range is selected. At this time, the reverse drive range pressure is also applied to the hydraulic servo 55. Therefore, the rod 453 is moved forwards (to the left in FIG. 29) so that the restraining member 452 is moved in the direction indicated by the arrow E and brought to the inhibition position.

When the restraining member 452 has been brought to the inhibition position, movement of the cam 14 is restrained. This is because the engagement member 451 and the restraining member 452 are in contact with each other even if the rod 13 is moved forwards. Therefore, forward movement of the cam 14 is inhibited and the engagement between the claw 18 and the tooth space 22 is inhibited.

When the driver has depressed the brake pedal to stop the vehicle, and moves the shift lever from the reverse drive range position to the parking range position, the control unit 465 turns the solenoid off. Thus, the reverse control valve 461 is brought to the left-half position so that oil in the hydraulic servos C-2 and B-4 is drained. As a result, the second clutch and the fourth brake are released and the parking range is selected. As the oil in the hydraulic servo 55 is also drained after a predetermined time has elapsed, the rod 453 is moved reversely (to the right in FIG. 29) so that the restraining member 452 is moved in the direction indicated by the arrow F. Thus, the restraining member 452 is brought to the inhibition release position.

When the restraining member 452 has been brought to the inhibition release position, the engagement member 451 and the restraining member 452 do not contact with each other. Therefore, forward movement of the rod 13 causes the cam 14 to move forwards. Thus, inhibition of the engagement between the claw 18 and the tooth space 22 is released.

When the driver has depressed the brake pedal to stop the vehicle and then shifted the shift lever from the reverse drive range position to the parking range position, the engagement between the claw 18 and the tooth space 22 is inhibited. After a predetermined time has elapsed and no residual torque exists, the inhibition of the engagement is released. Therefore, locking of the output shaft can be delayed.

As a result, the output shaft cannot be undesirably locked in the state where the residual torque exists between the parking gear 16 and the drive wheels.

If the driver operates the shift lever to select another range for driving the vehicle in the above-mentioned state, noise and shock are not generated. Thus, the driver does not feel uncomfortable.

When the reverse drive range is selected by operating the shift lever, the parking pole 417 is brought to the retraction position. Thus, the rod 453 is moved forwards and the restraining member 452 is moved in the direction indicated by the arrow E so as to be brought to the inhibition position.

Therefore, when the parking range is selected again, engagement between the claw 18 and the tooth space 22 can be delayed reliably.

Since the restraining member 452 can be moved by the hydraulic servo 55, release of the second clutch and the fourth brake can be detected without employing a special sensor. Therefore, the cost can be reduced.

Since the restraining member 452 is moved in the direction in which the rod 13 moves forwards or reversely, the load applied from the rod 13 does not act as a bending stress. Therefore, durability of the restraining member 452 can be improved.

A seventh embodiment of the invention will now be described.

Figure 30:
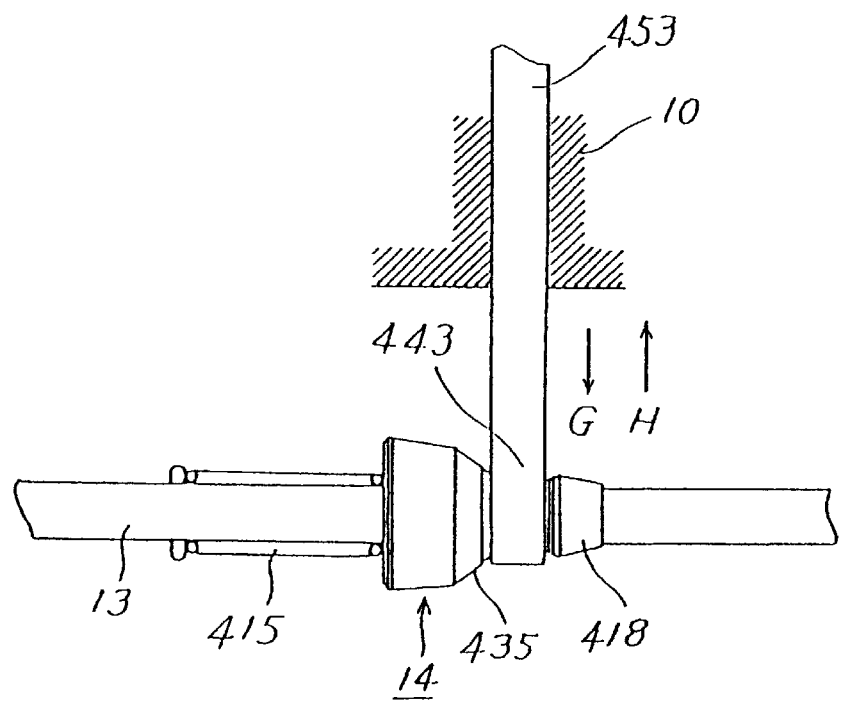
FIG. 30 is a side view showing an essential portion of a first state of a parking apparatus of an automatic transmission according to a seventh embodiment of the invention.
Figure 31:
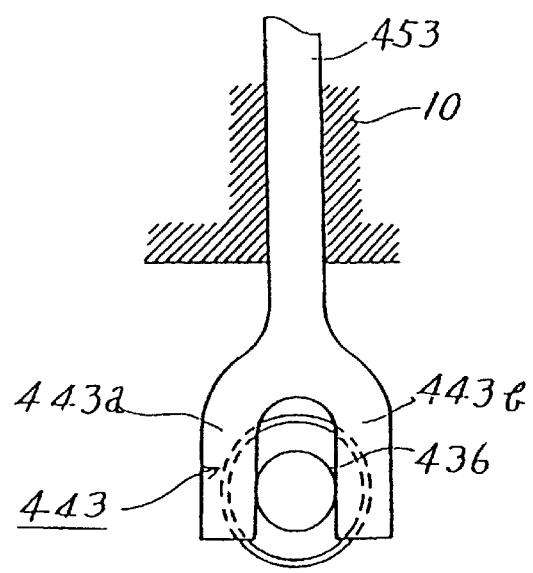
FIG. 31 is a front view showing an essential portion of a first state of the parking apparatus of an automatic transmission according to the seventh embodiment of the invention.
Figure 32:
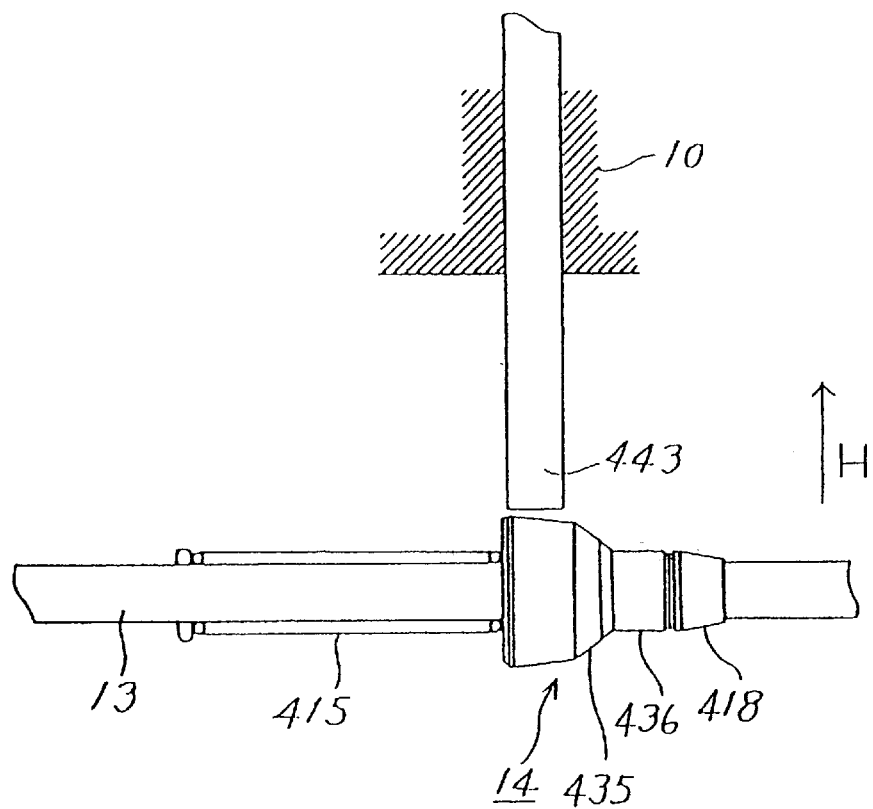
FIG. 32 is a side view showing an essential portion of a second state of the parking apparatus of an automatic transmission according to the seventh embodiment of the invention.
Figure 33:
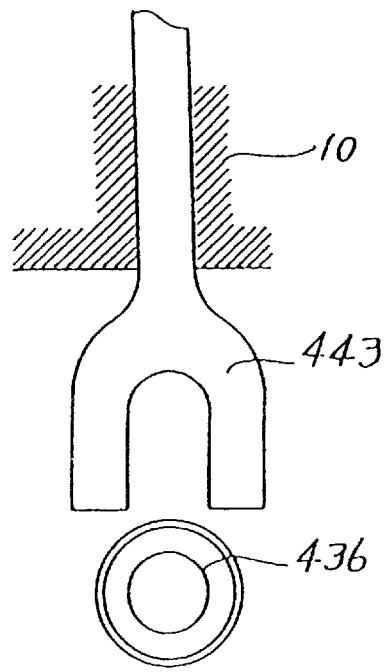
FIG. 33 is a front view showing an essential portion of a second state of the parking apparatus of an automatic transmission according to the seventh embodiment of the invention.

FIG. 30 is a side view showing an essential portion of a first state of a parking apparatus of an automatic transmission according to a seventh embodiment of the invention. FIG. 31 is a front view showing an essential portion of the first state of the parking apparatus of an automatic transmission according to the seventh embodiment of the invention. FIG. 32 is a side view showing an essential portion of a second state of the parking apparatus of an automatic transmission according to the seventh embodiment of the invention. FIG. 33 is a front view showing an essential portion of the second state of the parking apparatus of an automatic transmission according to the seventh embodiment of the invention. Elements having the same structures as those according to the sixth embodiment are given the same reference numerals and the foregoing elements are omitted from description.

In this embodiment, a restraining member 443 composed of two arms 443a, 443b and serving as an engagement inhibition means is formed at the leading end (at the lower end in FIG. 30) thereof. The restraining member 443 is, through the rod 453, connected to the hydraulic servo 55 (see FIG. 28) serving as the engagement inhibition release means. The distance between the arms 443a and 443b is set to be slightly longer than the diameter of a cylindrical surface 436 of the cam 14. The hydraulic servo 55 moves the restraining member 443 in a direction indicated by an arrow G so that the restraining member 443 is brought to the inhibition position. When the restraining member 443 is moved in a direction indicated by an arrow H, the restraining member 443 is brought to the inhibition release position.

Therefore, when the driver has operated a shift lever (not shown) to select the reverse drive range, the reverse drive range pressure is applied to the hydraulic servo 55. Thus, the rod 453 is moved forwards as shown in FIGS. 30, 31. As a result, the restraining member 443 is moved in the direction indicated by the arrow G so as to be brought to the inhibition position.

When the restraining member 443 has been brought to the inhibition position, the forward movement of the rod 13 cannot move the cam 14 forwards because the restraining member 443 is in contact with the conical portion 435 serving as the engagement member. Therefore, the engagement between the claw 18 (see FIG. 26) and the tooth space 22 can be inhibited.

When the driver has depressed a brake pedal (not shown) to stop the vehicle and moved the shift lever from the reverse drive range position to the parking range position, the rod 453 is moved reversely after a predetermined time has elapsed. Thus, the restraining member 443 is moved in a direction indicated by an arrow H so as to be brought to the inhibition release position.

Since the restraining member 443 does not contact with the conical portion 435 if the restraining member 443 is brought to the inhibition release position, the forward movement of the rod 13 causes the cam 14 to move forwards. Therefore, inhibition of the engagement between the claw 18 and the tooth space 22 is released.

Since the conical surface 435 of the cam 14 can be used as the engagement member, the cost can be reduced and the general versatility can be further improved.

An eighth embodiment of the invention will now be described.

Figure 34:
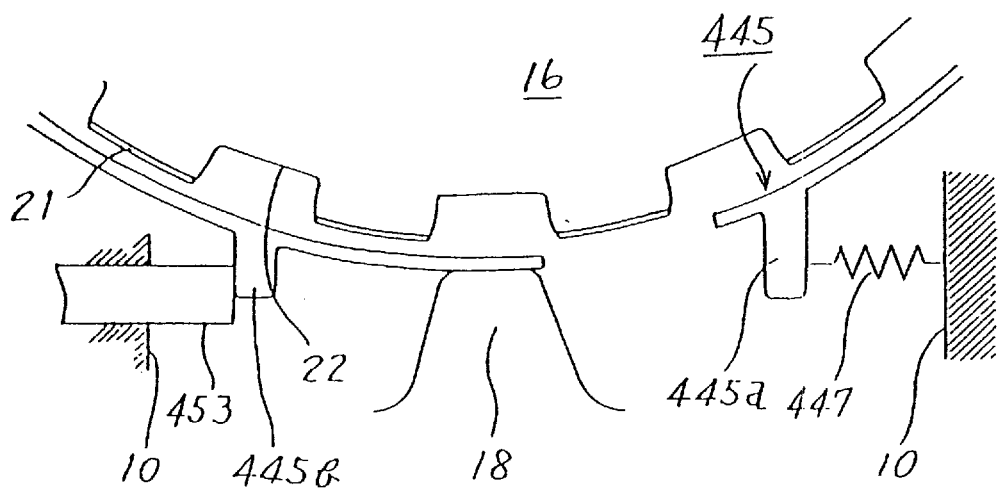
FIG. 34 is a front view showing an essential portion of a first state of a parking apparatus of an automatic transmission according to an eighth embodiment of the invention.
Figure 35:
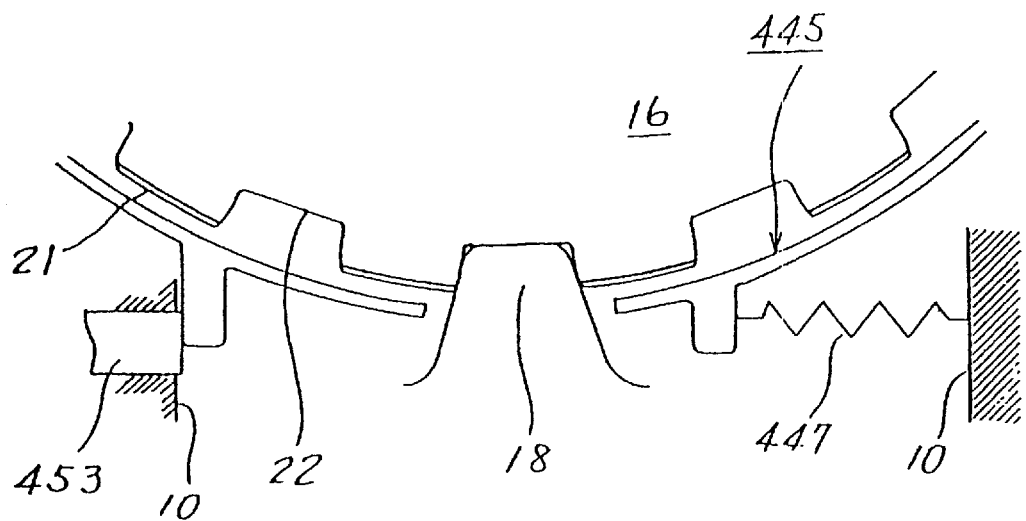
FIG. 35 is a front view showing an essential portion of a second state of the parking apparatus of an automatic transmission according to the eighth embodiment of the invention.

FIG. 34 is a front view showing an essential portion of a first state of a parking apparatus of an automatic transmission according to the eighth embodiment of the invention. FIG. 35 is a front view showing an essential portion of a second state of the parking apparatus of an automatic transmission according to the eighth embodiment of the invention.

In this embodiment, a ring 445 having an annular shape from which a portion is cut and serving as an engagement inhibition means is disposed around the parking gear 16. A first depression portion 445a is formed at one end of the ring 445. Meanwhile a second depression portion 445b is formed at the other end. A spring 447 is disposed between the first depression portion 445a and the casing 10. The spring 447 urges the ring 445 clockwise when viewed in the drawing. A rod 453 is movably disposed opposite to the second depression portion 445b. A hydraulic servo 55 (see FIG. 28) serving as an engagement inhibition release means is connected to the rear end of the rod 453.

The hydraulic servo 55 moves the rod 453 forwards (to the right in the drawing) so that the ring 445 is rotated counterclockwise to be located at the inhibition position. The hydraulic servo 55 moves the rod 453 reversely (to the left in the drawing) so that the ring 445 is rotated clockwise to be located at the inhibition release position.

Therefore, when the driver has operated a shift lever (not shown) to select the reverse drive range, the rod 453 is moved forwards. Thus, the ring 445 is rotated counterclockwise so as to be located at the inhibition position.

When the ring 445 has been brought to the inhibition position, existence of the ring 445 between the tooth space 22 and the claw 18 restrains the rotation of the parking pole 417 (see FIG. 26) even if the rod 13 (see FIG. 30) is moved forwards as shown in FIG. 34. Thus, the engagement between the claw 18 and the tooth space 22 can be inhibited.

When the driver has depressed a brake pedal (not shown) to stop the vehicle and moved the shift lever from the reverse drive range position to the parking range position, the rod 453 is moved reversely after a predetermined time has elapsed. Thus, the ring 445 is rotated clockwise so as to be brought to the inhibition release position.

When the ring 445 has been brought to the inhibition release position, the inhibition of the engagement between the claw 18 and the tooth space 22 is released because the ring 445 does not exist between the tooth space 22 and the claw 18 as shown in FIG. 35. Note that reference numeral 21 represents a tooth formed on the outer periphery of the parking gear 16.

In each of the above-mentioned embodiments, movement of the shift lever from the reverse drive range position to the parking range position is allowed even if the engagement between the claw 18 and the tooth space 22 is inhibited. Therefore, the delay in locking of the output shaft (not shown) cannot be sensed though a satisfactory shifting feeling can be realized.

A ninth embodiment of the invention which enables a driver to detect the delay in locking of the output shaft will now be described.

Figure 36:
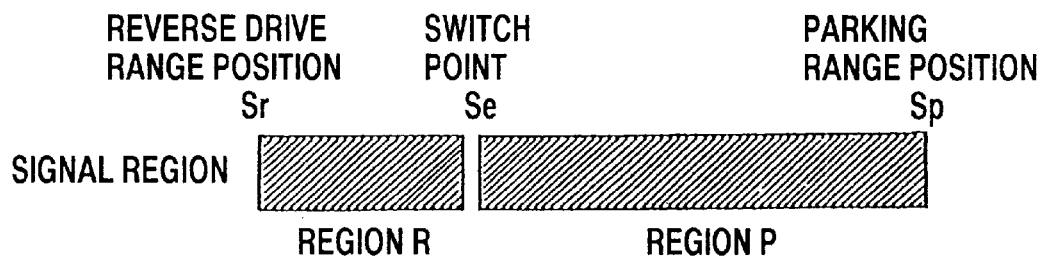
FIG. 36 is a diagram showing the relationship between the shift range positions of a shift lever and signal regions according to a ninth embodiment of the invention.
Figure 37:
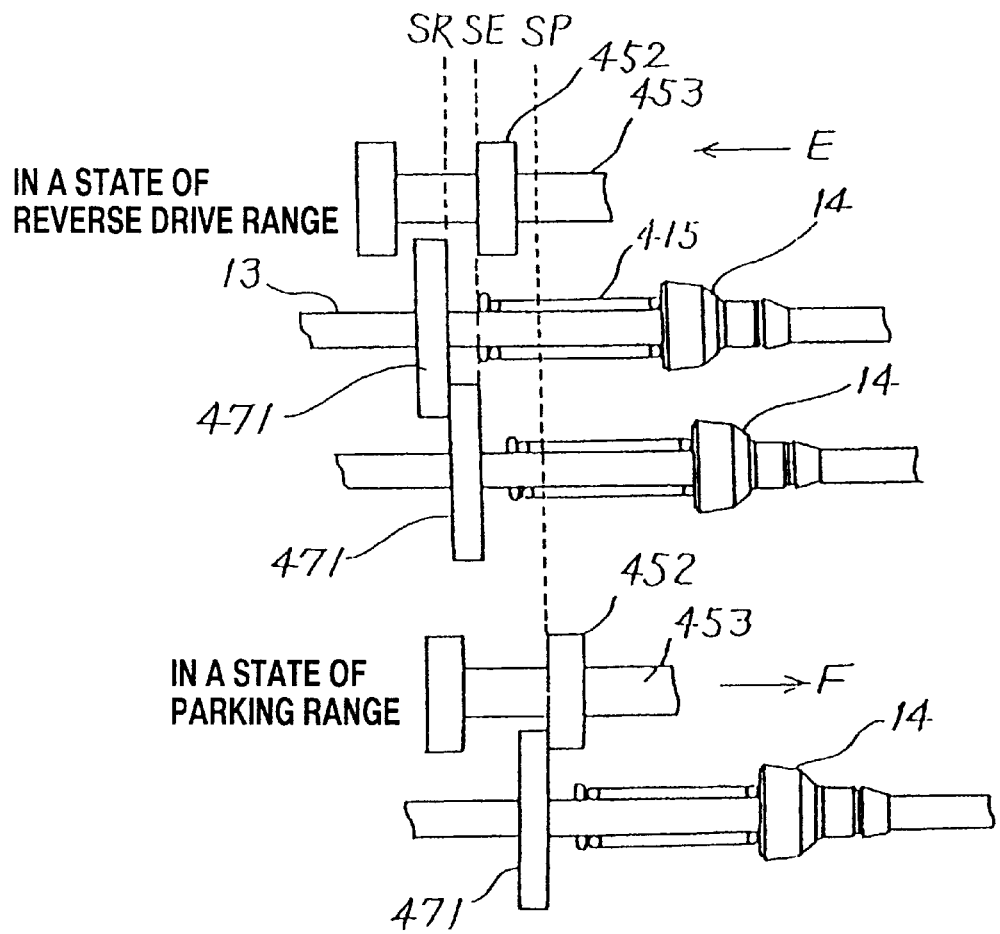
FIG. 37 is a diagram showing the operation of a parking apparatus of an automatic transmission according to the ninth embodiment of the invention.

FIG. 36 is a diagram showing the relationship between the shifting positions of the shift lever and signal regions realized according to the ninth embodiment of the invention. FIG. 37 is a diagram showing the operation of a parking apparatus of an automatic transmission according to the ninth embodiment of the invention.

In this embodiment, when the driver attempts to move the shift lever (not shown) from the reverse drive range position Sr to the parking range position Sp, the movement of the shift lever is prevented at a switch point Se set between the reverse drive range position Sr and the parking range position Sp. As a result, movement toward the parking range position Sp is inhibited during a period of time when locking of the output shaft (not shown) is delayed.

As shown in FIG. 36, a signal region from the reverse drive range position Sr for the shift lever to the switch point Se is set to be a region R. On the other hand, a signal region from the switch point Se to the parking range position Sp is set to be a region P. In the region R, a signal for the reverse drive which is transmitted from a shift position sensor to the control unit 465 (see FIG. 27) is turned on. In the region P, a signal for parking which is transmitted from the shift position sensor to the control unit 465 is turned on.

Therefore, when the shift lever has been moved to the switch point Se, the signal for parking is turned on. Thus, the control oil chamber 463 switches the reverse control valve 461 so as to start draining of oil in the hydraulic servo 55 serving as the engagement inhibition release means.

To prevent movement of the shift lever at the switch point Se, an engagement member 471 is secured to the rod 13 at a position rearward (to the left in the drawing) of the compression spring 415 as shown in FIG. 37. Moreover, a restraning member 452 serving as an engagement inhibition means is disposed adjacent to the rod 13 such that attachment/detachment to and from the parking pole 417 is allowed. Therefore, when the ergagement member 471 has been engaged with the restraining member 452, the movement of the shift lever toward the parking range position Sp can be restrained. Note that symbol SR represents the position of the engagement member 471 when the shift lever has been brought to the reverse drive range position Sr, SE represents the position of the same when the shift lever has been brought to the switch point Se and SP represents the position of the same when the shift lever has been brought to the parking range position Sp. Note that reference numeral 14 represents a cam.

The restraining member 452 is secured to the rod 453 so as to be connected to the hydraulic servo 55 through the rod 453. The hydraulic servo 55 moves the restraining member 452 in a direction indicated by an arrow E so as to bring the same to the inhibition position and brings the same in a direction indicated by an arrow F so as to bring the same to the inhibition release position.

Therefore, when the driver has operated the shift lever to select the reverse drive range, the rod 453 is moved forwards (to the left in FIG. 37) so that the restraining member 452 is moved in a direction indicated by an arrow E so as to be brought to the inhibition position.

When the restraining member 452 has been brought to the inhibition position, the movement of the shift lever by the driver from the reverse drive range position Sr to the parking range position Sp is inhibited. This is because once the engagement member 471 reaches the position SE, the parking pole 417 is engaged with the restraining member 452.

When the shift lever has reached the switch point Se, the signal region is switched to the region P. Thus, draining of oil in the hydraulic servo 55 is started. After a predetermined time has elapsed, the rod 453 is moved reversely (to the right in FIG. 37) so that the restraining member 452 is brought to the inhibition release position. As a result, the driver is allowed to move the shift lever to the parking range position Sp.

When the driver has depressed the brake pedal to stop the vehicle and moved the shift lever from the reverse drive range position Sr to the parking range position Sp, the engagement between the claw 18 (see FIG. 35) and the tooth space 22 is inhibited. After a predetermined time has elapsed, the inhibition of the engagement is released. Therefore, locking of the output shaft can be delayed. Moreover, delay of locking of the output shaft can be detected.

A tenth embodiment of the invention will now be described.

Figure 38:
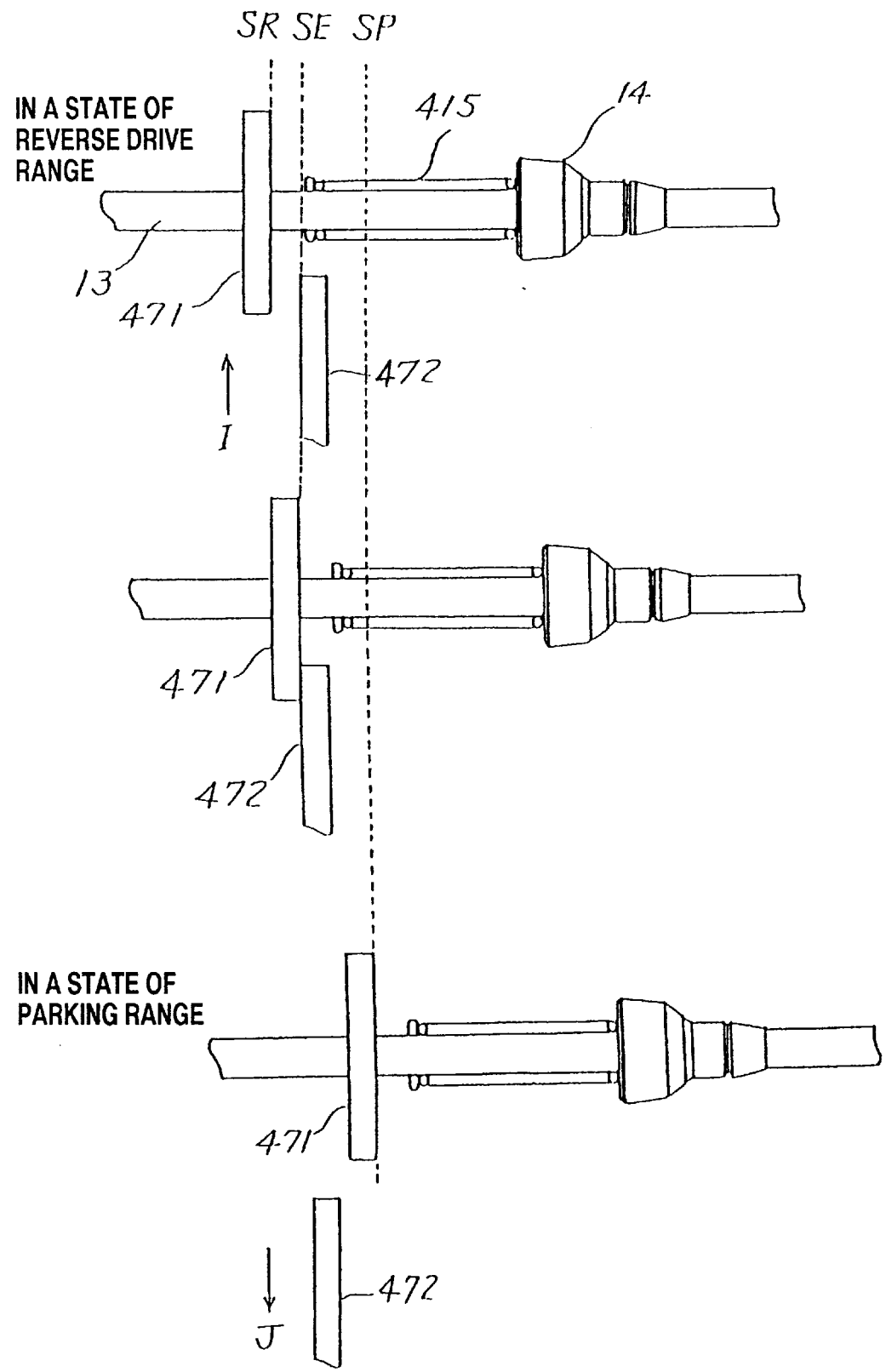
FIG. 38 is a diagram showing the operation of a parking apparatus of an automatic transmission according to a tenth embodiment of the invention.

FIG. 38 is a diagram showing the operation of a parking apparatus of an automatic transmission according to the tenth embodiment of the invention.

In this embodiment, movement of a shift lever (not shown) at the switch point Se is inhibited by securing a parking pole 417 to the rod 13 at a position further rearward (to the left in the drawing) of the compression spring 415. Moreover, a restraining member 472 serving as an engagement inhibition means is detachably disposed to the engagement member 471 at a position adjacent to the rod 13.

The restraining member 472 is secured to the rod 453 (see FIG. 37) so as to be connected to the hydraulic servo 55 (see FIG. 28) serving as an engagement inhibition release means through the rod 453. The hydraulic servo 55 moves the restraining member 472 in a direction indicated by an arrow I so as to bring the same to the inhibition position. Moreover, the hydraulic servo 55 moves the restraining member 472 in a direction indicated by an arrow J so as to bring the same to the inhibition release position.

Therefore, when the driver has operated the shift lever to select the reverse drive range, the restraining member 472 is moved in the direction indicated by the arrow I so as be brought to the inhibition position.

When the restraining member 472 has been brought to the inhibition position, the movement of the shift lever attempted by the driver from the reverse drive range position Sr to the parking range position Sp is inhibited. This is because once the engagement member 471 reaches the position SE, the engagement member 471 is engaged with the restraining member 472.

When the shift lever has reached the switch point Se, the signal region is switched to the region P. Thus, draining of oil in the hydraulic servo 55 is started. After a predetermined time has elapsed, the rod 453 is moved reversely so that the restraining member 472 is moved in the direction indicated by the arrow J so as to be brought to the inhibition release position. As a result, the driver is allowed to move the shift lever to the parking range position Sp.

As described above, when the driver has depressed the brake pedal (not shown) to stop the vehicle and moved the shift lever from the reverse drive range position Sr to the parking range position Sp, the engagement between the claw 18 (see FIG. 35) and the tooth space 22 is inhibited. After a predetermined time has elapsed, the inhibition of the engagement is released. Therefore, locking of the output shaft (not shown) can be delayed. Moreover, the delay in locking of the output shaft can also be detected. Note that reference numeral 14 represents the cam. Symbols SR and SP represent the respective positions of the engagement member 471.

An eleventh embodiment of the invention will now be described.

Figure 39:
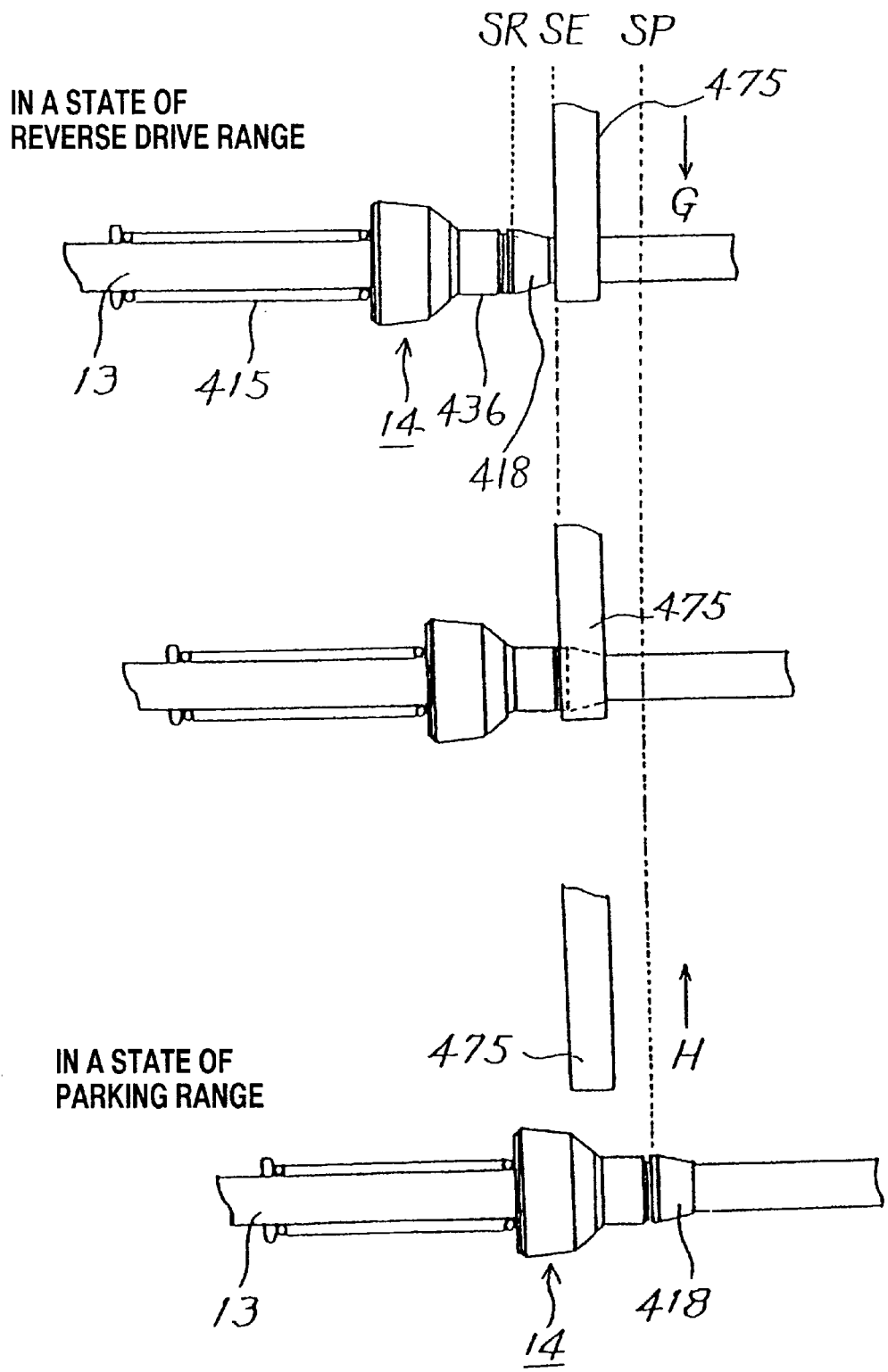
FIG. 39 is a diagram showing the operation of a parking apparatus of an automatic transmission according to an eleventh embodiment of the invention.

FIG. 39 is a diagram showing the operation of a parking apparatus of an automatic transmission according to the eleventh embodiment of the invention.

In this embodiment, a restraining member 475 composed of two arms (not shown) and serving as an engagement inhibition means is formed at the leading end of the rod 453 (see FIG. 37). The restraining member 475 is, through the rod 453, connected to the hydraulic servo 55 (see FIG. 28) serving as an engagement inhibition release means. The distance between the two arms is set to be slightly longer than the diameter of the rod 13. The hydraulic servo 55 moves the restraining member 475 in the direction indicated by the arrow G so as to bring the same to the inhibition position and move the same in the direction indicated by the arrow H so as to bring the same to the inhibition release position.

When the driver has operated the shift lever to select the reverse drive range, the reverse drive range pressure is applied to the hydraulic servo 55 so that the rod 453 is moved forwards. As a result, the restraining member 475 is moved in the direction indicated by the arrow G so as to be brought to the inhibition position.

When the restraining member 475 has been brought to the inhibition position, the forward movement of the rod 13 causes the restraining member 475 to be brought into contact with the guide portion 418 serving as the engagement member. Therefore, the cam 14 cannot move further forward. Thus, the engagement between the claw 18 (see FIG. 35) and the tooth space 22 is inhibited.

When the driver has depressed the brake pedal (not shown) to stop the vehicle and moved the shift lever from the reverse drive range position Sr (see FIG. 36) to the parking range position Sp, the rod 453 is moved reversely after a predetermined time has elapsed. Thus, the restraining member 475 is moved in the direction indicated by the arrow H so as to be brought to the inhibition release position.

As the restraining member 475 does not come in contact with the guide portion 418 after the restraining member 475 has been moved to the inhibition release position, forward movement of the rod 13 allows the cam 14 to move forwards. Therefore, the inhibition of the engagement between the claw 18 and the tooth space 22 is released.

When the driver has depressed the brake pedal to stop the vehicle and moved the shift lever from the reverse drive range position Sr to the parking range position Sp, the engagement between the claw 18 and the tooth space 22 is inhibited. After a predetermined time has elapsed, the inhibition of the engagement is released. Therefore, locking of the output shaft (not shown) can be delayed. Moreover, the delay in the output shaft can be detected.

Because the guide portion 418 can be used as the engagement member, the cost can be reduced and the general versatility can also be improved. Note that reference numeral 415 represents a compression spring, 436 represents a cylindrical surface and symbols SR, SE, SP represent the respective positions of the guide portion 418.

A twelfth embodiment of the invention will now be described.

Figure 40:
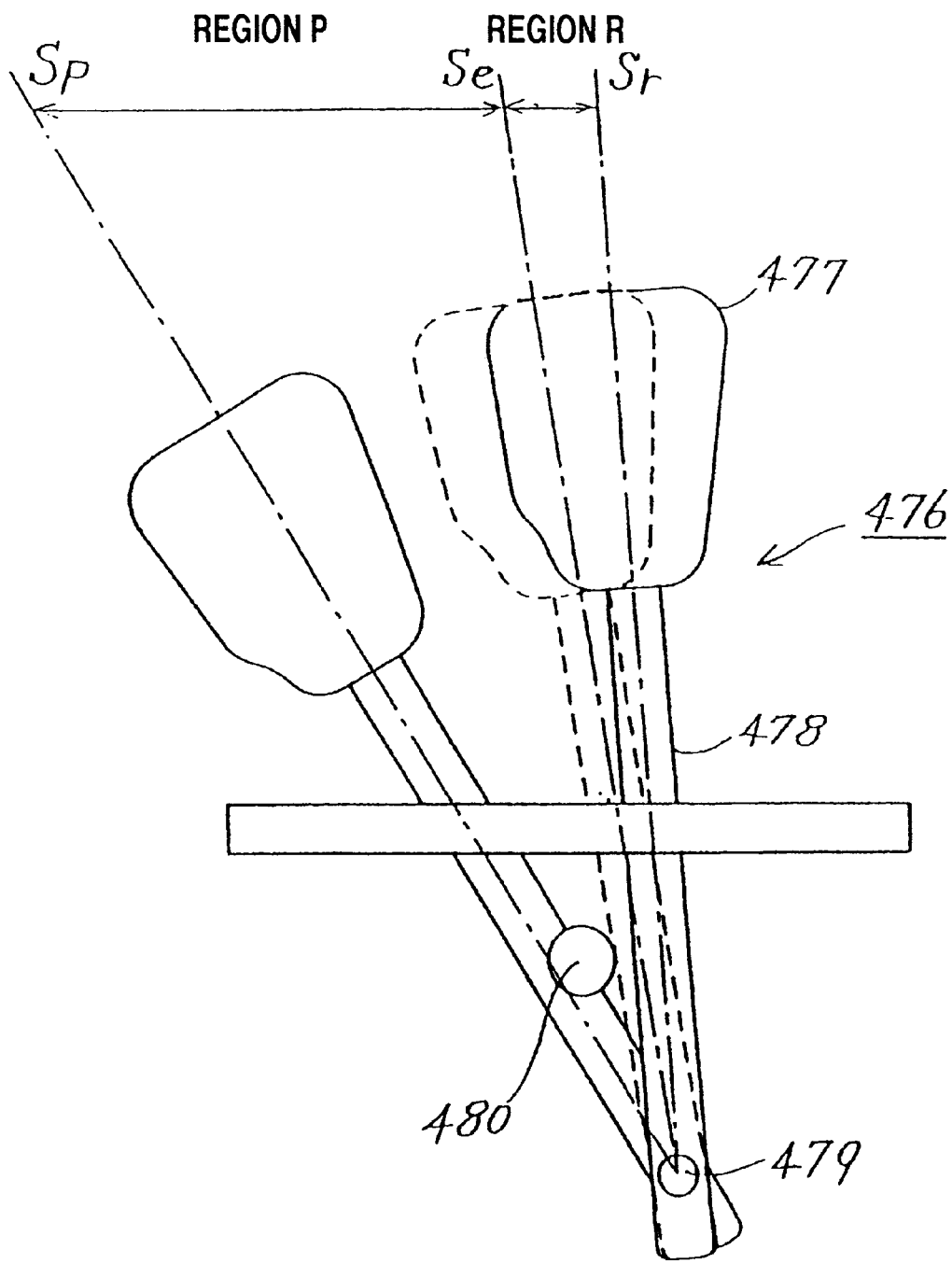
FIG. 40 is a diagram showing the operation of a parking apparatus of an automatic transmission according to a twelfth embodiment of the invention.

FIG. 40 is a diagram showing the operation of a parking apparatus of an automatic transmission according to a twelfth embodiment of the invention.

Referring to FIG. 40, reference numeral 476 represents a shift lever, 477 represents a grip, 478 represents a rod and 479 represents a center of swinging of the rod 478. Reference numeral 480 represents a restraining member serving as an engagement inhibition means for restraining the movement of the shift lever 476 at the switch point Se.

When the driver has attempted to operate the shift lever 476 to move the same from the reverse drive range position Sr to the parking range position Sp (the region R), the movement of the shift lever 476 is restrained at the switch point Se between the reverse drive range position Sr and the parking range position Sp. The movement toward the parking range position Sp is inhibited during the delay time. After the delay time has elapsed, the restraining member 480 is moved to permit the movement of the shift lever 476 in the region P from the reverse drive range position Sr to the parking range position Sp.

When the driver has depressed the brake pedal (not shown) to stop the vehicle and moved the shift lever 476 from the reverse drive range position Sr to the parking range position Sp, the movement of the shift lever 476 is restrained as described above. Thus, the engagement between the claw 18 (see FIG. 35) and the tooth space 22 is inhibited. After a predetermined time has elapsed, the movement of the shift lever 476 is allowed to release the inhibition of the engagement. Therefore, locking of the output shaft (not shown) can be delayed. Moreover, the delay in locking of the output shaft can also be detected.

A thirteenth embodiment of the invention will now be described.

Figure 41:
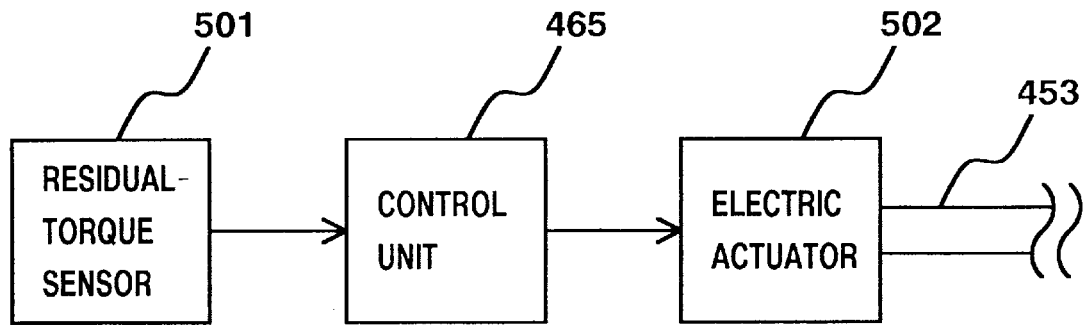
FIG. 41 is a block diagram showing a parking apparatus of an automatic transmission according to a thirteenth embodiment of the invention.
Figure 42:
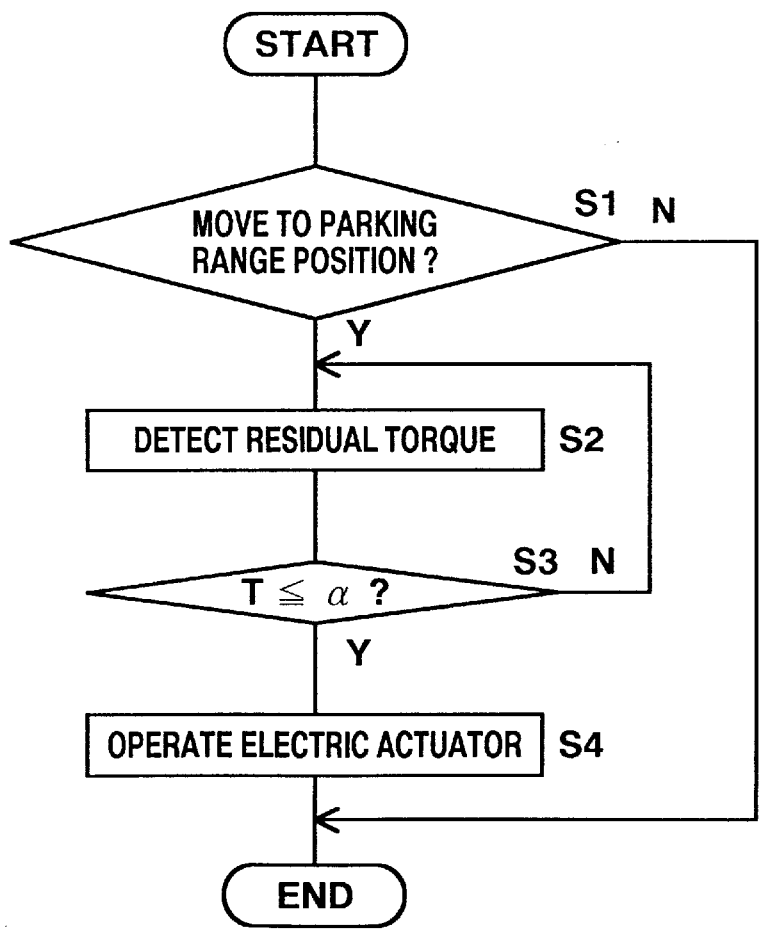
FIG. 42 is a flow chart showing the operation of the parking apparatus of an automatic transmission according to the thirteenth embodiment of the invention.

FIG. 41 is a block diagram showing a parking apparatus of an automatic transmission according to a thirteenth embodiment of the invention. FIG. 42 is a flow chart showing the operation of the parking apparatus of an automatic transmission according to the thirteenth embodiment of the invention.

Referring to the drawings, reference numeral 453 represents a rod provided with the restraining member 452 (see FIG. 29), 465 represents a control unit, 501 represents a residual-torque sensor serving as a residual-torque detection means for detecting residual torque T existing between the parking gear 16 (see FIG. 26) and drive wheels (not shown) and 502 represents an electric actuator. The electric actuator 502 moves the restraining member 452 to move the same to the inhibition position or the inhibition release position.

In this embodiment, an engagement inhibition release means (not shown) of the control unit 465 does not operate the electric actuator 502 when the residual torque T detected by the residual-torque sensor 501 is larger than a predetermined value a. If the residual torque T is not larger than the predetermined value a, the engagement inhibition release means operates the electric actuator 502 so as to bring the restraining member 452 to the inhibition release position.

Because the residual torque T is directly detected and the output shaft (not shown) is locked after the residual torque T has sufficiently been released, release of the rush of residual torque T existing between the parking gear 16 and the drive wheels can be prevented.

Therefore, noise and shock can be prevented and the driver does not feel uncomfortable.

The flow chart will now be described.

Step 1 It is determined whether the shift lever 476 (see FIG. 40) has been moved from the reverse drive range position Sr to the parking range position Sp. If it is determined that the shift lever 476 has been moved from the reverse drive range position Sr to the parking range position Sp, the process proceeds to step S2. If it is determined that the shift lever 476 has not been moved as described above, the process is ended.

Step S2 The residual-torque sensor 501 detects the residual torque T.

Step S3 It is determined whether the detected residual torque T is equal to or less than the predetermined value a. If the detected residual torque T is equal to or less than the predetermined value a, the process proceeds to step S4. If it is determined that the residual torque T is larger than the predetermined value a, the process returns to step S2.

Step S4 The electric actuator 502 is operated to bring the restraining member 452 to the inhibition release position.

Although the invention has been described in its preferred form with a certain degree of particularity, it is understood that the present disclosure of the preferred form can be changed in the details of construction and in the combination and arrangement of parts without departing from the spirit and the scope of the invention.

What is claimed is:

1. The parking apparatus of an automatic transmissions, comprising:

a parking gear having a plurality of teeth with a tooth space between each adjacent pair of teeth;

a parking pole swingably disposed and provided with a claw arranged to selectively be engaged with a tooth space of said parking gear;

engagement inhibition means movably disposed and arranged to be moved to an inhibition position for inhibiting engagement between said claw and said tooth space and to an inhibition release position for releasing the inhibition of the engagement; and engagement inhibition release means for moving said engagement inhibition means to the inhibition release position in synchronization with the rotation of said parking gear.

2. The parking apparatus of an automatic transmission according to claim 1, wherein said engagement inhibition means is provided with restoring means and arranged to be restored to the inhibition position by said restoring means when the engagement between said claw and said tooth space has been released.

3. The parking apparatus of an automatic transmission according to claim 1, wherein said engagement inhibition means is provided radially outwardly of said claw with respect to a swing shaft of said parking pole.

4. The parking apparatus of an automatic transmission according to claim 1, wherein said parking gear has a continuous contact surface arranged to be brought into contact with said engagement inhibition means and formed adjacent to the teeth and the tooth spaces.

5. The parking apparatus of an automatic transmission according to claim 1, wherein a recess is formed in a surface of said parking pole which is opposite to said parking gear so that a portion of said engagement inhibition means is accommodated in said recess.

6. The parking apparatus of an automatic transmission according to claim 1, wherein said engagement inhibition means is disposed adjacent to said parking pole.

7. The parking apparatus of an automatic transmission according to claim 1, wherein said engagement inhibition means has a pin provided radially inwardly of said claw with respect to a swing shaft of said parking pole, a swinging member disposed swingably about said pin and having, at the leading end thereof, a contact surface arranged to selectively be brought into contact with the front surface of the tooth and a coil spring, said engagement inhibition means being restored to the inhibition position by said coil spring when the engagement between said claw and said tooth space has been released.

8. The parking apparatus of an automatic transmission according to claim 1, wherein said engagement inhibition means has a pin provided radially outwardly of said claw with respect to a swing shaft of said parking pole, a swinging member disposed swingably about said pin and having, at the leading end thereof, a contact surface arranged to selectively be brought into contact with the front surface of the tooth and a coil spring, said engagement inhibition means being restored to the inhibition position by said coil spring when the engagement between said claw and said tooth space has been released.

9. The parking apparatus of an automatic transmission according to claim 1, wherein said engagement inhibition means has a pin provided radially outwardly of said claw with respect to a swing shaft of said parking pole, a swinging member disposed swingably about said pin and having, at the leading end thereof, a contact surface arranged to selectively be brought into contact with a continuous contact surface formed adjacent to said tooth and said tooth space and a coil spring, said engagement inhibition means being restored to the inhibition position by said coil spring when the engagement between said claw and said tooth space has been released.

10. The parking apparatus of an automatic transmission according to claim 2, wherein said restoring means has first and second coil springs and a guide member disposed between said first and second coil springs.

11. The parking apparatus of an automatic transmission according to claim 10, wherein said first and second coil springs are formed integrally and connected in series.

12. The parking apparatus of an automatic transmission according to claim 1, wherein said engagement inhibition means has a swinging member swingably mounted to said parking pole, and said parking pole has a stopper for restraining rotation of said swinging member.

13. The parking apparatus of an automatic transmission according to claim 7, wherein said swinging member has a restraining pin which is able to come in contact with said stopper, and said restraining pin is formed separately from said swinging member.

14. The parking apparatus of an automatic transmission, comprising:

a parking gear;

a parking pole swingably disposed and having a claw arranged to selectively be engaged with a tooth space of said parking gear;

engagement inhibition means disposed movably and arranged to be moved to an inhibition position for inhibiting engagement between said claw and said tooth space and to an inhibition release position for releasing said engagement;

a friction engagement element arranged to be engaged when a predetermined drive range has been selected and released when a parking range has been selected; and engagement inhibition release means for bringing said engagement inhibition means to the inhibition release position in accordance with a state of said friction engagement element.

15. The parking apparatus of an automatic transmission according to claim 14, wherein each of said friction engagement element and said engagement inhibition release means has a hydraulic servo, and the same hydraulic pressure is supplied to each of said hydraulic servos.

16. A parking apparatus of an automatic transmission according to claim 14, further comprising a rod arranged to be moved forwards or reversely when a shifting apparatus has been operated; and a cam disposed slidably with respect to said rod and arranged to swing said parking pole when said rotation is moved forwards or reversely, wherein said engagement inhibition means is moved in a direction in which said rod is moved forwards or reversely.

17. The parking apparatus of an automatic transmission according to claim 16, wherein an engagement member is secured to said cam, and said engagement inhibition means is disposed detachably with respect to said engagement member.

18. The parking apparatus of an automatic transmission according to claim 16, wherein an engagement member is secured to said rod, and said engagement inhibition means is disposed detachably with respect to said engagement member.

19. The parking apparatus of an automatic transmission according to claim 18, wherein said engagement member is a cam.

20. The parking apparatus of an automatic transmission according to claim 18, wherein said engagement member is a guide portion for said rod.

21. The parking apparatus of an automatic transmission according to claim 14, wherein said engagement inhibition means is disposed between said parking gear and said parking pole and arranged to restrain a swing motion of said parking pole.

22. A parking apparatus of an automatic transmission, comprising:

a parking gear;

a parking pole disposed swingably and having a claw arranged to selectively be engaged with a tooth space of said parking gear;

engagement inhibition means disposed movably and arranged to be moved to an inhibition position for inhibiting engagement between said claw and said tooth space and to an inhibition release position for releasing inhibition of said engagement; and engagement inhibition release means for moving said engagement inhibition means to the inhibition release position in accordance with a residual torque existing between said parking gear and drive wheels upon stop of a vehicle.

23. The parking apparatus of an automatic transmission according to claim 22, further comprising residual-torque detection means for detecting a residual torque, wherein said engagement inhibition release means moves said engagement inhibition means from the inhibition position to the inhibition release position in accordance with the residual torque detected by said residual-torque detection means.

* * * * *